(12) United States Patent
Kurebayashi

(10) Patent No.: US 9,821,231 B2
(45) Date of Patent: Nov. 21, 2017

(54) GAME PROGRAM

(71) Applicant: COLOPL, Inc., Tokyo (JP)

(72) Inventor: Hajime Kurebayashi, Saitama (JP)

(73) Assignee: COLOPL, Inc., Tokyo (JP)

( * ) Notice: Subject to any disclaimer, the term of this patent is extended or adjusted under 35 U.S.C. 154(b) by 0 days.

(21) Appl. No.: 15/342,837

(22) Filed: Nov. 3, 2016

(65) Prior Publication Data
US 2017/0157515 A1 Jun. 8, 2017

(30) Foreign Application Priority Data

Dec. 4, 2015 (JP) .................. 2015-237758
Dec. 4, 2015 (JP) .................. 2015-237759

(51) Int. Cl.
*A63F 9/24* (2006.01)
*A63F 13/63* (2014.01)
*A63F 13/35* (2014.01)
*A63F 13/537* (2014.01)
*A63F 13/822* (2014.01)

(52) U.S. Cl.
CPC ............. *A63F 13/63* (2014.09); *A63F 13/35* (2014.09); *A63F 13/537* (2014.09); *A63F 13/822* (2014.09)

(58) Field of Classification Search
USPC ....................................... 463/9, 30
See application file for complete search history.

(56) References Cited

U.S. PATENT DOCUMENTS 8,262,477 B2  9/2012 Koganezawa et al.
2003/0190950 A1* 10/2003 Matsumoto ............. A63F 13/10
463/30

(Continued)

FOREIGN PATENT DOCUMENTS

JP   2003-123089 A   4/2003
JP   2010-252932 A   11/2010

(Continued)

OTHER PUBLICATIONS

"Internet game territory capture game RAWAR", Flaman, Aug. 26, 2015, http://flamani.blog.fc2.com/blog-entry-3795.html, Retrieved on Apr. 8, 2016. (Cited in JPOA dated Apr. 20, 2016 in corresponding JP Patent Application 2015-237759; Listed as reference in "Decision to Grant a Patent" dated Jul. 7, 2016 in corresponding JP Patent Application 2015-237759).

*Primary Examiner* — Pierre E Elisca
(74) *Attorney, Agent, or Firm* — Metrolexis Law Group, PLLC

(57) ABSTRACT

A computer executing a game program performs operations such as providing a game space shared by at least a first user and a second user through a network; arranging at least a first object associated with the first user and a second object and a third object associated with the second user in the game space; operating a first character having a first number associated with the first object to advance from the first object toward the second object and displaying the first character; operating a second character having a second number associated with the third object to advance toward the first character, and reducing the first number on the basis of the second number according to the advance of the second character; and operating the first character having the reduced first number to reach the second object and displaying the first character.

14 Claims, 34 Drawing Sheets

(56) References Cited

U.S. PATENT DOCUMENTS

| | | | |
|---|---|---|---|
| 2010/0273544 A1 | 10/2010 | Koganezawa et al. | |
| 2013/0296054 A1* | 11/2013 | Sawano | A63F 13/10 463/31 |
| 2016/0107085 A1 | 4/2016 | Eda | |
| 2017/0072317 A1* | 3/2017 | Nishikawa | A63F 13/5378 |
| 2017/0232335 A1* | 8/2017 | Williams | A63F 13/235 |

FOREIGN PATENT DOCUMENTS

| | | |
|---|---|---|
| JP | 2014-073164 A | 4/2014 |
| JP | 5525096 B1 | 6/2014 |
| JP | 2014-223471 A | 12/2014 |
| JP | 2015-008966 A | 1/2015 |
| JP | 2015-150152 A | 8/2015 |
| JP | 2015-155002 A | 8/2015 |
| JP | 2015-195841 A | 11/2015 |
| JP | 5838280 B1 | 1/2016 |
| WO | 2014054653 A1 | 4/2014 |
| WO | 2015046447 A1 | 4/2015 |

* cited by examiner

| USER | OWNED COINS | OWNED ITEMS | OWNED DIAMONDS | OWNED OBJECTS | ARRANGE-MENT POSITION | STATE | ELAPSED TIME | OWNED POPU-LATION | OBJECT LEVEL (OL) | ... |
|---|---|---|---|---|---|---|---|---|---|---|
| A | 1000 | VEGETABLE 1 CHAIR 2 | 25 | CONDO-MINIUM | X1/Y1 | CONSTRUCTED | 150 SECONDS | 3000 | 5 | ... |
| | | | | SHOP | X1/Y1 | CONSTRUCTED | 150 SECONDS | 0 | 5 | ... |
| | | | | FIELD | X2/Y2 | CONSTRUCTED | 120 SECONDS | 0 | 3 | ... |
| | | | | FIRE-HOUSE | X3/Y3 | UNDER CONSTRUCTION | 300 SECONDS | 0 | 10 | ... |
| ... | ... | ... | ... | ... | ... | ... | ... | ... | ... | ... |

| OBJECT NAME | TYPE | POPULATION THAT CAN BE OWNED | POWER SUPPLY AMOUNT | POWER CONSUMPTION | COIN PRODUCTION AMOUNT | PRODUCED ITEM | CONSTRUCTION TIME | PREPARATION TIME | ... |
|---|---|---|---|---|---|---|---|---|---|
| CONDOMINIUM | HOUSE | 1000 | 0 | 200 | 0 | NONE | 3 HOURS | NONE | ... |
| SHOP | COMMERCIAL FACILITY | 0 | 0 | 100 | 300 | NONE | 10 MINUTES | 15 MINUTES | ... |
| FIELD | PRODUCTION FACILITY | 0 | 0 | 20 | 0 | VEGETABLE | 30 MINUTES | 30 MINUTES | ... |
| PARK | PUBLIC FACILITY | 0 | 0 | 0 | 0 | 0 | 5 MINUTES | NONE | ... |
| ELECTRIC POWER PLANT | INFRASTRUCTURE | 0 | 500 | 0 | 0 | 0 | 40 MINUTES | NONE | ... |
| FIREHOUSE | PUBLIC FACILITY | 0 | 0 | 50 | 0 | NONE | 40 MINUTES | NONE | ... |
| ... | ... | ... | ... | ... | ... | ... | ... | ... | ... |

320

| OBJECT NAME | SKILL CONTENT | EFFECTIVE RANGE |
|---|---|---|
| PARK | INCREASE POPULATION OF BUILDING PRESENT WITHIN EFFECTIVE RANGE BY 300 | 5 × 5 |
| ELECTRIC POWER PLANT | REDUCE POPULATION OF BUILDING PRESENT WITHIN EFFECTIVE RANGE BY 200 | 5 × 5 |
| ... | ... | ... |

330

| OBJECT NAME | SKILL CONTENT | EFFECTIVE RANGE | COOL TIME |
|---|---|---|---|
| FIREHOUSE | EXTINGUISH FIRE OF BUILDING PRESENT WITHIN EFFECTIVE RANGE | 9 × 9 | 1 HOUR |
| OFFICE | ATTACK BUILDING OF ANOTHER USER PRESENT WITHIN EFFECTIVE RANGE | 5 × 6 | 2 HOURS |
| ... | ... | ... | ... |

FLOW OF PASSIVE SKILL ACTIVATION

| USER | OWNED COINS | OWNED ITEMS | OWNED DIAMONDS | OWNED OBJECTS | ARRANGEMENT POSITION | STATE | ELAPSED TIME | OWNED POPULATION | UTILIZATION DEGREE | OBJECT LEVEL (OL) | HIT POINTS (HP) | NUMBER OF STORED CHARACTERS | ... |
|---|---|---|---|---|---|---|---|---|---|---|---|---|---|
| A | 0 | NONE | 25 | CONDOMINIUM | WAREHOUSE | NOT CONSTRUCTED | 0 SECONDS | 0 | 0 | 0 | 50 PT | 0 | ... |
|  |  |  |  | SHOP | X1/Y1 | CONSTRUCTED | 20 SECONDS | 100 | 0.7 | 2 | 300 PT | 5 | ... |
|  |  |  |  | FIELD | X2/Y2 | CONSTRUCTED | 100 SECONDS | 20 | 0.7 | 5 | 1000 PT | 30 | ... |
|  |  |  |  | FIREHOUSE | X3/Y3 | UNDER CONSTRUCTION | 30 SECONDS | 0 | 0.25 | 1 | 250 PT | 3 | ... |
| B | ... | ... | ... | ... | ... | ... | ... | ... | ... | ... | ... | ... | ... |
| C | ... | ... | ... | ... | ... | ... | ... | ... | ... | ... | ... | ... | ... |
| D | ... | ... | ... | ... | ... | ... | ... | ... | ... | ... | ... | ... | ... |

| CHARACTER | DISPATCH SOURCE OBJECT | DISPATCH DESTINATION OBJECT TYPE | DISPATCH SPEED | OFFENSIVE POWER /NUMBER OF TIMES | HIT POINTS | INFLUENCE INTERVAL | DISPATCH PERIOD | ... |
|---|---|---|---|---|---|---|---|---|
| GANG | OFFICE | COMMERCIAL FACILITY | 2 SQUARES /SECOND | 25 PT | 10 PT | 1 MINUTE | 15 MINUTES | ... |
| GRAFFITI GROUP | CONDOMINIUM | HOUSE | 4 SQUARES /SECOND | 40 PT | 15 PT | 3 MINUTES | 10 MINUTES | ... |
| ... | ... | ... | ... | ... | ... | ... | ... | ... |

| CHARACTER | DISPATCH SOURCE OBJECT | DISPATCH SPEED | OFFENSIVE POWER /NUMBER OF TIMES | INFLUENCE INTERVAL | DISPATCH PERIOD | ... |
|---|---|---|---|---|---|---|
| POLICEMAN | POLICE STATION | 3 SQUARES/SECOND | 1 PT | 5 SECONDS | 1 MINUTE | ... |
| FIREFIGHTER | FIREHOUSE | 3 SQUARES/SECOND | 2 PT | 2 SECONDS | 1 MINUTE | ... |
| ... | | ... | ... | ... | ... | ... |

GAME PROGRAM

CROSS REFERENCE TO RELATED APPLICATIONS

This application claims priority based on 35 USC §119 from prior Japanese Patent Application No. 2015-237758 filed on Dec. 4, 2015, entitled "GAME PROGRAM", and prior Japanese Patent Application No. 2015-237759 filed on Dec. 4, 2015, entitled "GAME PROGRAM", the entire contents of which are incorporated herein by reference.

BACKGROUND

The present disclosure relates to a game program.

DESCRIPTION OF THE RELATED ART

A battle field simulation game that allows a plurality of users to share a common game space through a network and compete for and expand their own regions by performing user actions has been provided. Japanese Patent Application Laid-Open No. 2014-223471 (Patent Document 1) and WO 2015-046447 (Patent Document 2) disclose games that enable a player who has constructed a larger number of superior facilities to more advantageously advance in the game than the other players.

In the game disclosed in Patent Documents 1 and 2, a base-enhancing element such as town development is used as means for enhancing the military power of a player in battling a military unit of another player. Game points for determining victory or defeat of the game are not given for the town development itself.

SUMMARY

An object of the present disclosure is to improve the gameplay of a town development element.

According to the present disclosure, there is provided a game program that causes a computer to execute: providing a game space shared by at least a first user and a second user through a network, at least a first object associated with the first user and a second object and a third object associated with the second user being arranged in the game space; operating, in the game space, a first character having a first number associated with the first object to advance from the first object toward the second object and displaying the first character; operating, in the game space, a second character having a second number associated with the third object to advance toward the first character and displaying the second character; and reducing, in the game space, the first number on the basis of the second number according to the advance of the second character and operating the first character having the reduced first number to reach the second object and displaying the first character.

According to the present disclosure, there is provided a game program that causes a computer to execute a method comprising: providing a game space shared by at least a first user and a second user through a network, at least a first object associated with the first user and a second object associated with the second user being arranged in the game space; setting a route from the first object to the second object according to action on the first object performed by the first user when it is determined that at least a part of the second object is arranged within an effective range of the first object; and causing, according to the set route, fluctuation of a second parameter associated with the second object.

According to the present disclosure, it is possible to improve the gameplay of a town development element.

BRIEF DESCRIPTION OF THE DRAWINGS

FIG. 5 is a diagram illustrating an example of a user management table in at least one embodiment;

FIG. 6 is a diagram illustrating an example of an object management table in at least one embodiment;

FIG. 20 is a diagram illustrating an example of a battle user management table;

FIG. 27 is a diagram illustrating an example of a mob character management table;

FIG. 28 is a diagram illustrating an example of the mob character management table;

DETAILED DESCRIPTION OF EMBODIMENTS

Figure 1:
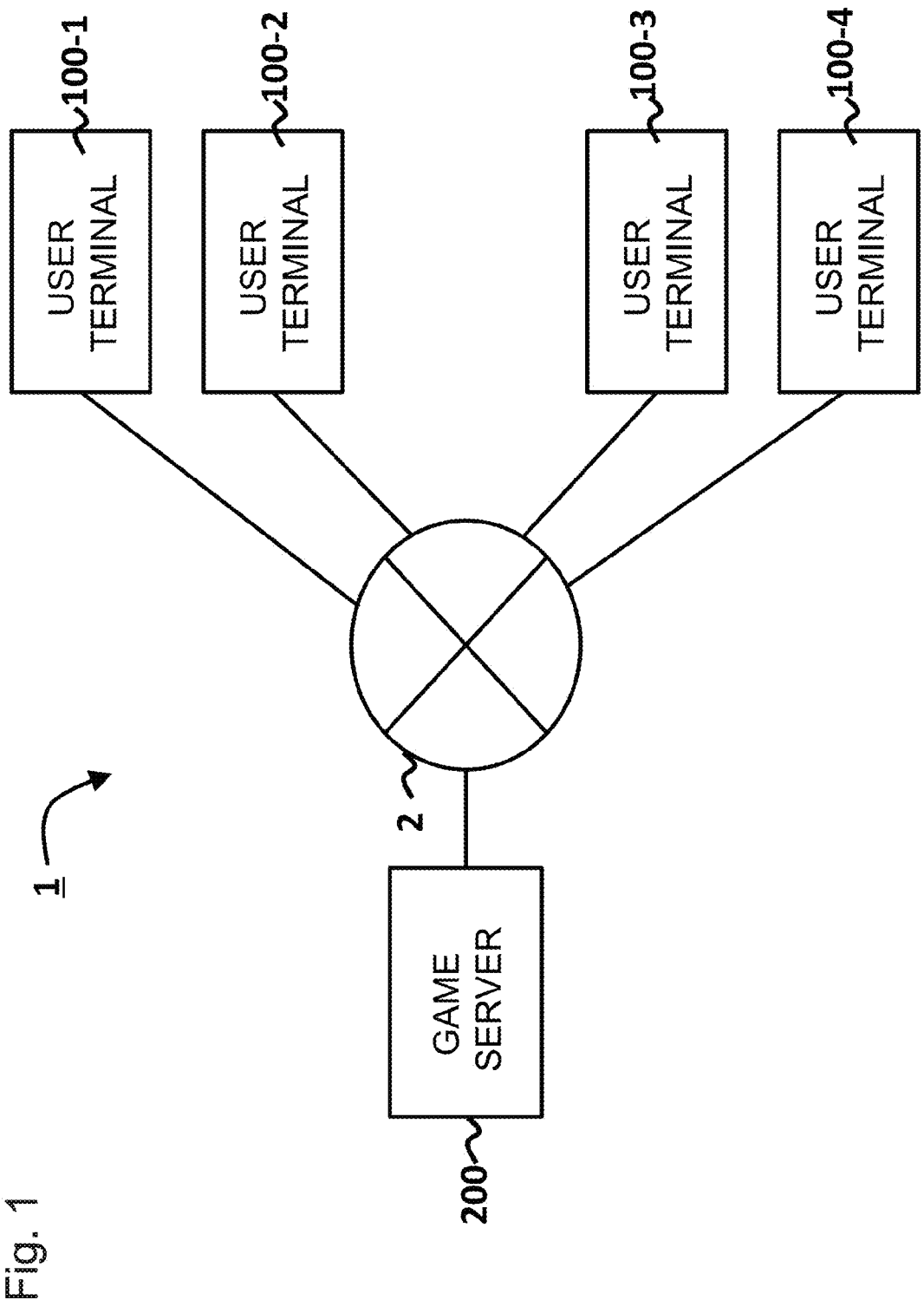
FIG. 1 is a diagram illustrating a game system in at least one embodiment.

[Explanation of One or More Embodiments of the Present Disclosure]

First, contents of at least one embodiment of the present disclosure are listed and explained. A game program in at least one embodiment of the present disclosure includes a configuration explained below. As will be understood, reference to a "game program," "a game program that causes a computer to execute," and the like, may include reference to a computer, which executes a game program thus causing the computer to perform operations or to execute functions as described herein. In other embodiments, the game program may be embodied as a non-transitory computer readable medium configured with the game program, which when read an executed by a computer causes the computer to perform operations. In accordance with the one or more embodiments, improvement in the operation of the computer or the system in which the computer executing the game program is implemented may be improved.

[Item 1] A computer executing a game program that causes the computer to perform operations comprising: providing a game space shared by at least a first user and a second user through a network, at least a first object (OA2) associated with the first user and a second object (OB2) and a third object (OB3) associated with the second user being arranged in the game space; operating, in the game space, a first character (saboteur) having a first number associated with the first object to advance from the first object toward the second object and displaying the first character; operating, in the game space, a second character having a second number associated with the third object to advance toward the first character and displaying the second character; and reducing, in the game space, the first number on the basis of the second number according to the advance of the second character and operating the first character having the reduced first number to reach the second object and displaying the first character.

Consequently, it is possible to improve the gameplay and, in particular, improve importance of strategic thinking in arranging a game object in a battle game space.

[Item 2] In the game program described in the item 1, the game program may further cause the computer to execute setting a route from the first object to the second object according to action on the first object performed by the first user, and the game program may cause the first character having the first number to advance along the route in the operating the first character having the first number to advance from the first object toward the second object and displaying the first character.

[Item 3] In the game program described in the item 1 or 2, the game program may further cause the computer to execute processing causing, according to the reaching of the first character having the reduced first number to the second object, fluctuation of a value (HP) of a second parameter associated with the second object.

[Item 4] In the game program described in the item 1 or 2, the game program may further cause the computer to execute specifying an effective range (E9) in the game space associated with the third object and determining whether at least a part of the route is arranged within the effective range of the third object, and, when at least a part of the route is arranged within the effective range, the game program may cause the computer to execute the operating the second character to advance toward the first character and displaying the second character.

[Item 5] In the game program described in any one of the items 1 to 4, in the game space, a fourth object associated with the first user and the second user may be further arranged, and the route may be set via the fourth object.

[Item 6] In the game program described in the item 5, the game program may be a game program for advance of a town development game, and, in the providing the game space, each of the first to fourth objects may be arranged on one or more lattices on a lattice-like space plane provided in the game space, the first object, the second object, and the third object may be building objects, and the fourth object may be a road object.

[Item 7] In the game program described in any one of the items 1 to 6, the first number may be based on a first parameter associated with the first object.

[Item 8] A non-transitory computer readable medium may be configured with a game program that, when read and executed, causes a computer to perform operations comprising: providing a game space shared by at least a first user and a second user through a network, at least a first object (OA2) associated with the first user and a second object (OB2) associated with the second user being arranged in the game space; setting a route (PT1, PT2) from the first object to the second object according to action on the first object performed by the first user when it is determined that at least a part of the second object is arranged within an effective range (E9) of the first object; and causing, according to the set route, fluctuation of a value of a second parameter (HP) associated with the second object. Consequently, it is possible to improve the gameplay and, in particular, improve importance of strategic thinking in arranging a game object in a battle game space.

[Item 9] In the game program described in the item 8, the game program may cause the computer to execute operating, in the game space, a first character having a number defined by a first parameter associated with the first object to advance along the route from the first object toward the second object and displaying the first character; and determining whether the first character reaches the second object, the causing the fluctuation of the value of the second parameter may be executed when the first character reaches the second object.

[Item 10] In the game program described in the item 9, wherein in the providing the game space, a third object associated with the second user may be further arranged in the game space, the program may further cause the computer to execute: specifying an effective range in the game space associated with the third object; and determining whether at least a part of the route is arranged within the effective range of the third object, and the causing the fluctuation of the value of the second parameter may cause the fluctuation of the value of the second parameter according to a third parameter associated with the third object when at least the part of the route is arranged within the effective range of the third object.

[Item 11] In the game program described in the item 10, the game program may further cause the computer to execute reducing, out of the number of the first character, a number of the first character that reaches the second object according to the third parameter associated with the third character, wherein the causing the fluctuation of the value of the second parameter may depend on the number of the first character that reaches the second object.

[Item 12] In the program described in any of the items 8 to 11, in the game space, a fourth object associating the first object with the second object may be further arranged, and the route may be set via the fourth object.

[Item 13] In the game program described in the item 12, the game program may be a game program for advance of a town development game, in the providing the game space, each of the first to fourth objects may be arranged on one or more lattices on a lattice-like space plane provided in the game space, the first object, the second object, and the third object may be building objects, and the fourth object may be a road object.

[Item 14] In the game program described in any one of the items 8 to 13, the value of the second parameter may be fluctuated according to a first parameter associated with the first object.

[Details of Specific Embodiments of the Present Disclosure]

Specific examples of the game program according to one or more embodiments of the present disclosure are explained below with reference to the drawings. Note that the present disclosure is not limited to these illustrations and is indicated by claims. It is intended that all changes within meaning and scope of or which are equivalents to the claims are included in the present disclosure. In the following explanation, the same elements are denoted by the same reference numerals and signs in the explanation of the drawings. Redundant explanation of the elements may be omitted for brevity and ease of understanding.

A game system 1 in at least one embodiment, for example, as shown in FIG. 1, provides a plurality of users with a town development simulation game. The game system 1 includes a plurality of user terminals 100-1 to 100-4 and a game server 200. The user terminals 100 and the game server 200 are connected through a network 2. The game server 200 provides the user terminals 100 with various services concerning the game. Examples of the network 2 include the Internet and a wireless network (e.g., WiFi (registered trademark)) constructed by a radio base station (not shown).

Figure 2:
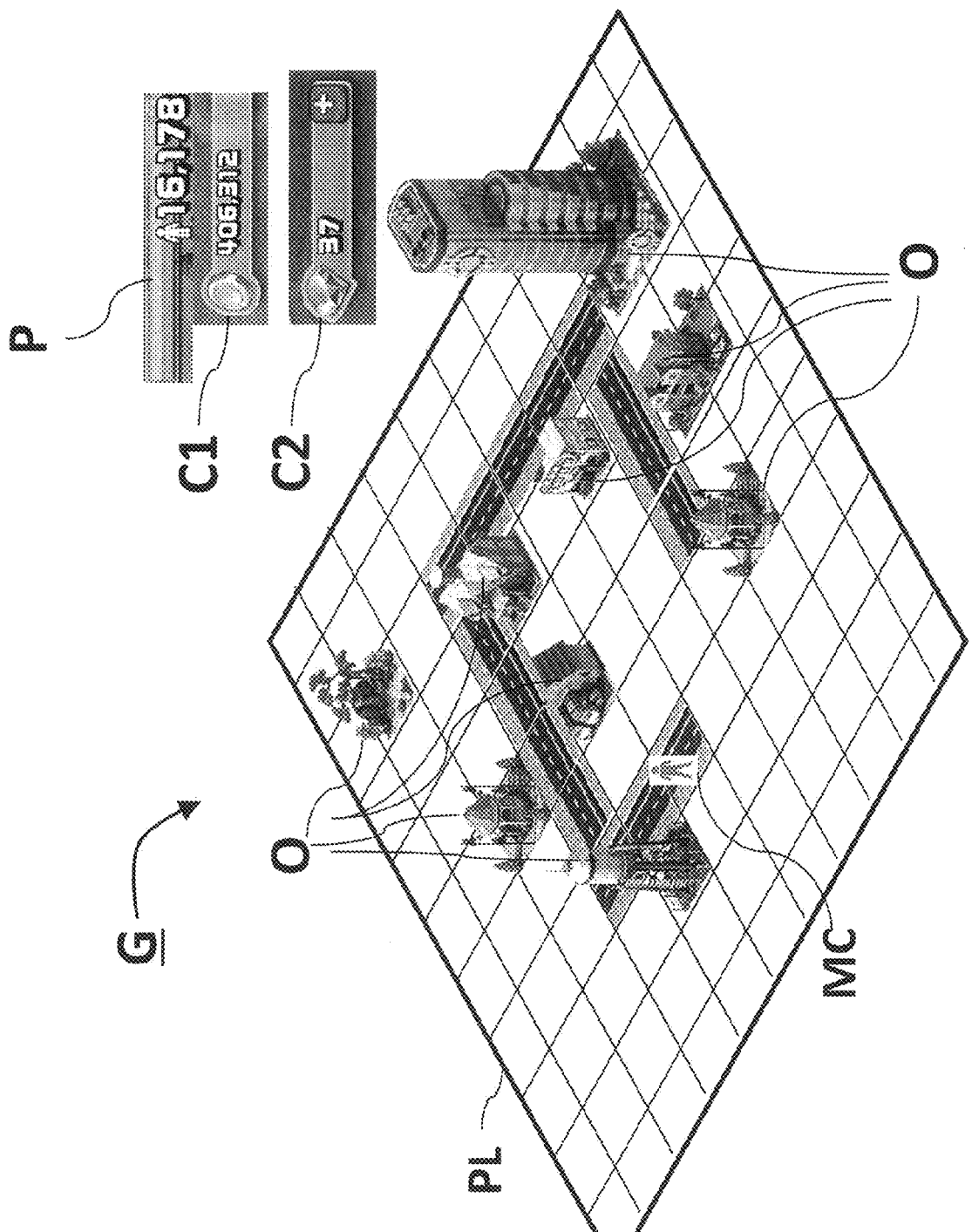
FIG. 2 is a diagram illustrating a game space in the at least one embodiment.

The users advance the game by arranging various objects O (e.g., building objects and road objects; hereinafter sometimes collectively referred to as "game objects") on a plane PL in a virtual game space G shown in FIG. 2. The game space G is configured by, for example, a plane formed by a plurality of lattices and a background indicating the sky, a distant view, and the like. In at least one embodiment, each of a plurality of objects O is arranged on one or more of the lattices. The number of lattices necessary for arranging the object is determined for each of buildings. The users can acquire game points by arranging the objects O in the game space G. The game points include, for example, a "population" P associated with each of the objects. The users own game parameters such as various in-game items besides a "coin" C1 and a "diamond" C2 serving as in-game currencies. Further, mob characters MC that perform predetermined motions may be arranged along a road provided on the plane.

Figure 3:
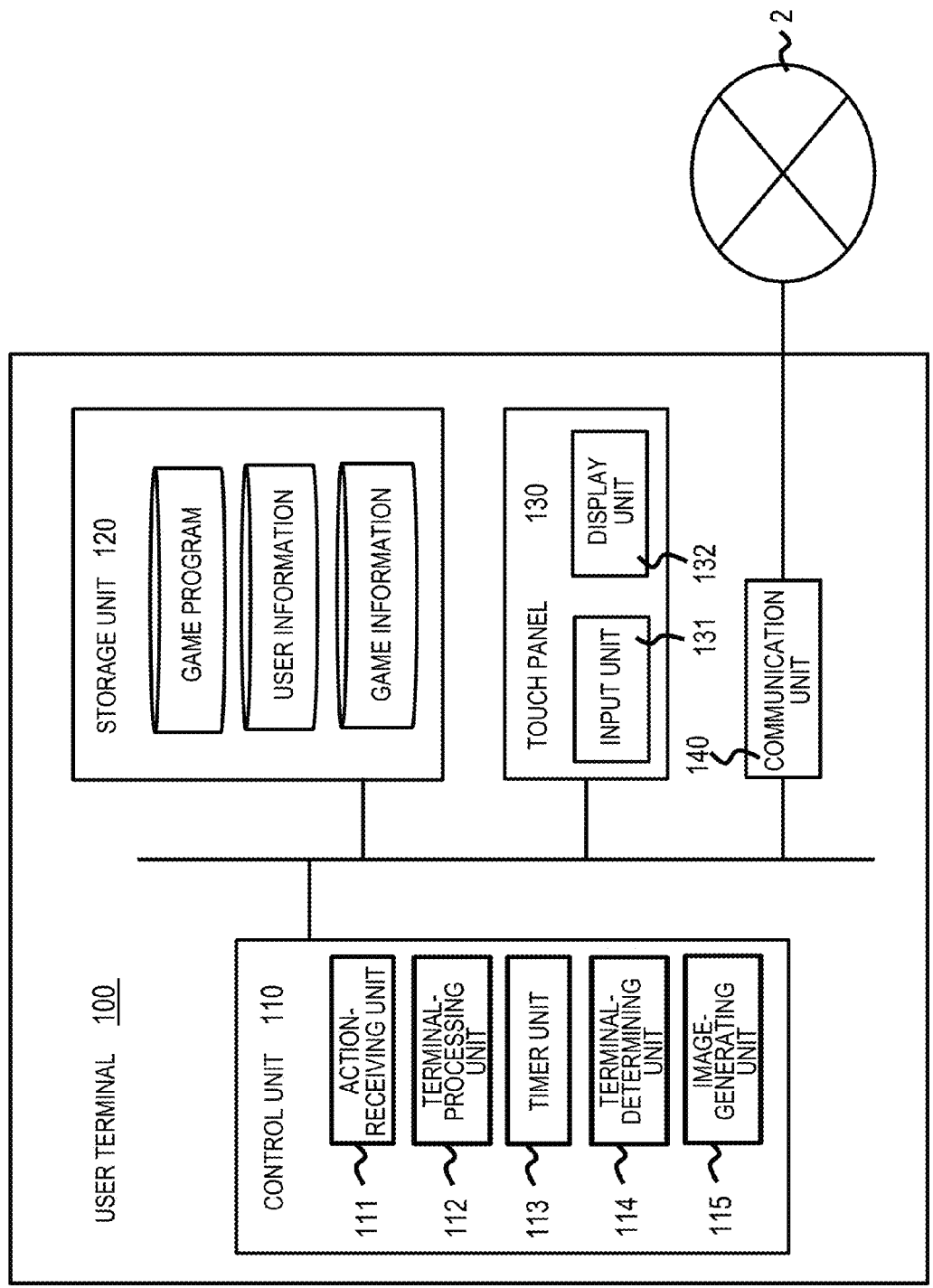
FIG. 3 is a diagram illustrating the configuration of a user terminal in at least one embodiment.

FIG. 3 shows the configuration of each of the user terminals 100. The user terminal 100 may be a portable terminal such as a smartphone, a feature phone, a PDA, or a tablet computer. The user terminal 100 includes a control unit 110, a storage unit 120, an input unit 131, a display unit 132, and a communication unit 140 connected to one another by a bus. The user terminal 100 may include a touch panel 130 that configures the input unit 131 and the display unit 132. The user can operate game objects in the game space G via the touch panel 130. The input unit 131 detects operation on the touch panel 130 by the user and detects performance of some operation (mainly physical contact operation such as touch operation, slide operation, swipe operation, or tap operation) on the user terminal 100. The touch panel 130 can be configured by a liquid crystal display or the like including a touch sensing unit.

The communication unit 140 performs control for executing transmission and reception of various kinds of information to and from the game server 200. In at least one embodiment, a request from the user terminal 100 includes an operation instruction for causing the game server 200 to transmit a predetermined game program and game data to the user terminal 100 and an instruction for advancing the game. For example, the communication unit 140 transmits a user ID to the game server 200 and performs a request via the network 2 to thereby receive information concerning a game object associated with the user ID (e.g., object information such as an owned building). When the game object is arranged in the game space G on the basis of operation by the user, the communication unit 140 transmits to the game server 200 game points acquired as a result of arranging the game object.

The control unit 110 may include a CPU and the like. The communication unit 140 establishes connection between the user terminal 100 and the network 2 according to control by the control unit 110. The storage unit 120 includes a main memory configured by a volatile storage device such as a DRAM and an auxiliary memory configured by a nonvolatile storage device such as a flash memory or an HDD. In the auxiliary memory, a game program and the like downloaded from the game server 200 are stored. The game program is developed on the main memory and executed by the control unit 110. The control unit 110 of the user terminal 100 can function as an action-receiving unit 111, a terminal-processing unit 112, a timer unit 113, a terminal-determining unit 114, and an image-generating unit 115 according to the game program. Note that data generated by the control unit 110 while operating according to the game program and data used by the control unit 110 are also temporarily stored in the main memory.

The action-receiving unit 111 detects action of the user on the input unit 131. The action-receiving unit 111 discriminates what kind of input such as an operation instruction via the touch panel 130 or other buttons is performed and outputs a result of the discrimination to necessary elements such as the terminal-processing unit 112. When an operation input to the touch panel 130 is performed, the action-receiving unit 111 detects coordinate information of an operation input position and detects what kind of operation such as touch operation or slide operation is performed. By detecting that a continuously detected input is interrupted, the action-receiving unit 111 can also detect that the user releases the touch from the touch panel 130.

The terminal-processing unit 112 controls the operation of the entire user terminal 100 and performs transmission and reception of data among the elements and arithmetic processing necessary for execution of the game. For example, the terminal-processing unit 112 develops a game conforming to a game program on the basis of an operation input detected by the action-receiving unit 111 and instructs the image-generating unit 115 to draw a game image serving as a result of the game development. For example, the terminal-processing unit 112 operates a game object in a virtual space on the basis of an operation input to the touch panel 130. The terminal-processing unit 112 may perform, according to an advance state of the game, processing for controlling the position of a virtual camera for designating a visual field of the game space G.

The timer unit 113 measures elapse of time in the game space G. The timer unit 113 has a function of measuring time individually for the objects O arranged in the game space G. For example, as explained below, the timer unit 113 causes the storage unit 120 to store times when the objects are arranged in the game space G and measures time elapsed thereafter to thereby provide the terminal-determining unit 114 with a construction time until the objects O change from an object under construction to a constructed object, a preparation time from time when the objects O change to the constructed object until various game points can be acquired, and time information for determining whether a cool time before a skill can be activated has elapsed. The timer unit 113 may measure a battle time explained below.

The terminal-determining unit 114 executes various kinds of determination necessary for game advance with reference to various kinds of user information and game information stored in the storage unit 120 on the basis of a determination request from the terminal-processing unit 112. For example, the terminal-determining unit 114 determines whether the objects O arranged in the game space G satisfy predetermined conditions. As explained below, the terminal-determining unit 114 acquires time information of the objects O with reference to the timer unit 113 and the storage unit 120 and determines whether conditions serving as bases for determining game points set in the objects O and given to users are satisfied.

The image-generating unit 115 generates, on the basis of user information received from the game server 200, an arithmetic operation result by the game program, and an operation input to the input unit 131 by the user, images of the game space G, the game objects O, and the like displayed on the display unit 132. The image-generating unit 115 may generate an image or an animation of the mob characters MC moving on the plane PL. In at least one embodiment, the user terminal 100 acquires information concerning types and arrangement positions of the objects O arranged in the game space G by the user and generates an image of the game space G. The image-generating unit 115 updates a displayed image according to game advance control by the terminal-processing unit 112.

Figure 4:
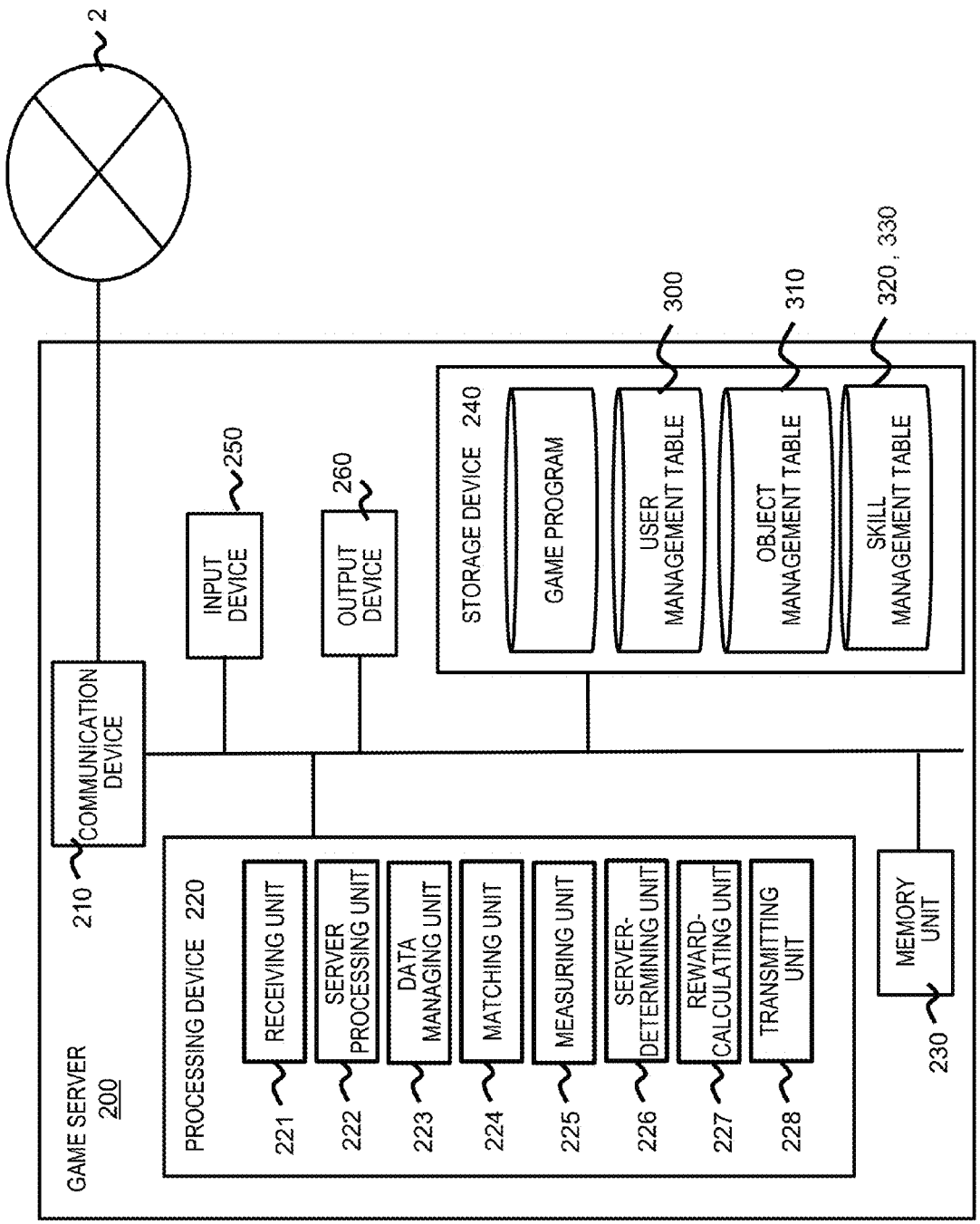
FIG. 4 is a diagram illustrating the configuration of a game server in at least one embodiment.

FIG. 4 shows the configuration of the game server 200. The game server 200 is an information processing apparatus used by a system administrator or the like in controlling and managing a game provided to a user (a player). The game server 200 is a general-purpose computer such as a work station or a personal computer. The game server 200 in at least one embodiment has a game-providing function for providing the user terminals 100 with information necessary for game advance. The game server 200 receives various operation instructions from the user terminals 100 and transmits a game program operable on the user terminals 100, a Web page (a game screen, etc.), various data such as game parameters, various notifications, and the like. The game server 200 includes a communication device 210, which is a network interface that communicates with the network 2, a processing device 220, a memory unit 230, a storage device 240, an input device 250, and an output device 260, which are electrically connected to one another by a bus.

The processing device 220 controls the operation of the entire game server 200 and performs transmission and reception of data among the elements and arithmetic processing necessary for execution of a game. The processing device 220 is, for example, a CPU (Central Processing Unit).

The processing device 220 executes a program or the like stored in the storage device 240 and developed on the memory unit 230, whereby necessary processing is realized. By means of the program, the processing device 220 can function as a receiving unit 221, a server processing unit 222, a data managing unit 223, a matching unit 224, a measuring unit 225, a server-determining unit 226, a reward-calculating unit 227, and a transmitting unit 228.

The memory unit 230 is a volatile storage device such as a DRAM (Dynamic Random Access Memory). The storage device 240 is a nonvolatile storage device such as a flash memory or an HDD (Hard Disc Drive). Note that, in the main memory, data generated by the control unit 110 of the user terminal while operating according to the program and data used by the control unit 110 are also temporarily stored. In the storage device 240, a game program and a user authentication program are stored. Besides, databases such as a user management table 300, an object management table 310, and a skill management table 320 may be constructed as explained below.

The receiving unit 221 receives various kinds of information from the user terminals 100. The user terminals 100 transmit the various kinds of information to the game server 200 according to control by the communication unit 140. In response to the transmission, the game server 200 receives the information via the network 2 and the communication device 210. The receiving unit 221 identifies and receives contents of the information. The receiving unit 221 refers to the various management table stored in the storage device 240. The data managing unit 223 updates the various management tables according to necessity to thereby execute necessary processing. The information includes various requests for operation for arranging objects associated with the users in the game space G, operation for deleting the objects, operation for moving the objects, operation for purchasing and selling the objects, operation for buying out the objects, and the like.

The server processing unit 222 controls the operation of the entire game server 200 and performs transmission and reception of data among the elements and arithmetic processing necessary for execution of a game. The data managing unit 223 updates, on the basis of various arithmetic operation results in the server processing unit 222, the various databases stored in the storage device 240. For example, when the user applies action to the user terminal 100 to arrange the objects O in the game space G, the receiving unit 221 receives object information and information concerning game points owned by the user as a result of the action. The server processing unit 222 executes necessary processing. The data managing unit 223 performs addition, update, and deletion of records of the user management table 300 on the basis of the data.

When receiving a request for arranging objects in the game space G from the user terminal 100, the data managing unit 223 stores information concerning the objects arranged in the game space G in association with user information and information concerning arrangement positions and the like of the objects. As explained below, when fluctuation occurs in game points related to the users and the objects, the data managing unit 223 updates the various databases to associate information concerning a result of the fluctuation with the objects.

The matching unit 224 performs a series of processing for matching a plurality of users and starting a battle game. When a user inputs a battle game start request in a home game space explained below, the matching unit 224 generates a lobby and specifies the user as a user waiting to be matched. When users waiting to be matched specified in the lobby reach a predetermined number, the matching unit 224 configures a battle game space for the users and causes the server processing unit 222 to execute processing for starting the battle game.

The measuring unit 225 mainly manages a battle time in the battle game. As explained below, when a request for battle game start processing is received from the matching unit 224, the measuring unit 225 starts measurement of the battle time and unitarily manages battle times among the plurality of users. The measuring unit 225 measures time information of the game space G and collates the time information with time information of the game space G in the timer unit 113. Consequently, the time information of the game space G is synchronized in the user terminal 100 and the game server 200. Measurement and determination of the various kinds of time information can be smoothly carried out.

The server-determining unit 226 executes, on the basis of a determination request received from the server processing unit 222, various kinds of determination necessary for game advance with reference to various kinds of user information and game information stored in the storage device 240. The server-determining unit 226 determines victory and defeat of a battle by referring to the game points owned by the users at the end of the battle game. The victory and defeat may be determined on the basis of game points such as the population P described above. Other elements such as a predetermined game parameter associated with the users such as the coin C1, a predetermined game parameter associated with the objects O, and an occupancy ratio of the game space G may also be taken into account.

The reward-calculating unit 227 calculates, on the basis of a victory and defeat determination result in the server-determining unit 226, rewards provided to the users. The reward-calculating unit 227 may also refer to order information of the users in the battle game and distribute to the users rewards corresponding to the order.

The transmitting unit 228 performs control for transmitting, to the user terminal 100, a game program operable on the user terminal 100, game space information such as a game screen, game points and game parameters, various data such as rewards, various notifications, and the like.

The input device 250 is an information input device such as a mouse or a keyboard. The output device 260 is a liquid crystal display or the like and is used to monitor information of the computer. At least a part of the functions of the user terminal 100 may be included in the game server 200. At least a part of the functions of the game server 200 may be included in the user terminal 100. That is, the computer in which the game program in at least one embodiment is executed is optionally selected from information processing apparatuses and the like including the aforementioned user terminal 100 and the game server 200.

In FIG. 5, there is shown an example of the user management table 300 for managing user information such as game points owned by the users, game parameters, and objects. The user management table 300 is stored in the storage device 240 of the game server 200 and/or the storage unit 120 of the user terminal 100. In the user management table 300, user information for identifying the users, game parameters such as coins, items, and diamonds owned by the users, and object information such as buildings owned by the users are associated. Basic information concerning objects is managed in the object management table 310 explained below. In the user management table 300, object levels (OL) indicating developing degrees of objects associated with owning users, parameter correction values of buildings by the object levels, and arrangement positions in the game space G of the buildings are managed. As explained below, states of buildings concerning whether the objects are under construction or already constructed, elapsed times after the objects are arranged in the game space G, or elapsed times indicating times after the objects are constructed are also managed. Owned populations serving as game points associated with the objects are managed. Total values of the owning populations of the objects are managed as game points associated with the user.

In FIG. 6, there is shown an example of an object management table 310 for master-managing information associated with the objects. In at least one embodiment, for the objects, information concerning game points and game parameters that can be acquired such as object IDs, object names, types of the objects, populations that can be owned, and coins and items to be produced is specified in the objects. To make it possible to acquire game points and game parameters from the objects, it is necessary to operate the objects. Power consumption is also specified as a game parameter necessary for operating the objects. A construction time, which is time necessary from the time when the objects are arranged in the game space G as buildings under construction until the objects change to constructed buildings, and a preparation time necessary for the objects to produce coins and items are set. Pluralities of preparation times may be set. Production amounts of the coins and items may be set to increase every time the preparation time elapses. Besides the above, for example, information associating images corresponding to the objects may be included as an item of the object management table 310. Note that the items in table 310 are only examples and are not intended to be exhaustive or limiting.

Figure 7:
FIG. 7 is a diagram illustrating an example of a passive skill management table in at least one embodiment.
Figure 8:
FIG. 8 is a diagram illustrating an example of an active skill management table in at least one embodiment.

FIGS. 7 and 8, show examples of skill management tables 320 and 330 for master-managing skills associated with the objects. The term "skills" may refer to processing for, using activation processing for one game object by action of a user as a trigger, positively or negatively affecting the other game objects arranged in the space G. The skills may include, for example, a passive skill and an active skill. A passive skill may refer to a skill that can be automatically activated by a computer. An active skill may refer to a skill that can be activated manually by the user.

After being arranged in the game space G, by changing to constructed buildings, objects having passive skills shown in FIG. 7 change to a state in which the objects can activate predetermined skills (passive skills) for advantageously advancing a game. For the objects, contents of the skills and effective ranges, which are ranges of the influence of the skills, are specified. Effects by the skills are automatically given to the objects arranged within the effective ranges. After being arranged in the game space G, by changing to constructed buildings and receiving a skill activation request from the user, objects that can activate active skills shown in FIG. 8 (hereinafter sometimes referred to as skill objects) can activate predetermined skills for advantageously advancing a game. For the objects, contents of the skills, effective ranges, which are ranges of the influence of the skills, and a cool time until the skills can be activated are set. The effective ranges may be specified by the numbers of longitudinal and lateral squares such as "5×5" or may be specified in the manner of "the entire plane PL." When the objects are changed to constructed objects or the skill is used once, the objects or skills become subject to the cool time, and the user cannot activate the skills for a predetermined time.

A flow of processing of the game system 1 according to at least one embodiment is explained in detail below with reference to FIGS. 9 to 34. By selecting, from an object list (not shown in the figure), objects that the user desires to arrange (so-called "construct") in the game space G and designating places, the user can arrange the objects in the game space G. As explained above, the user can acquire populations, coins (in-game currencies), and various items serving as game points by arranging the objects in the game space G. By selecting objects already arranged and designating other places, the user can move arrangement positions of the objects.

Figure 9:
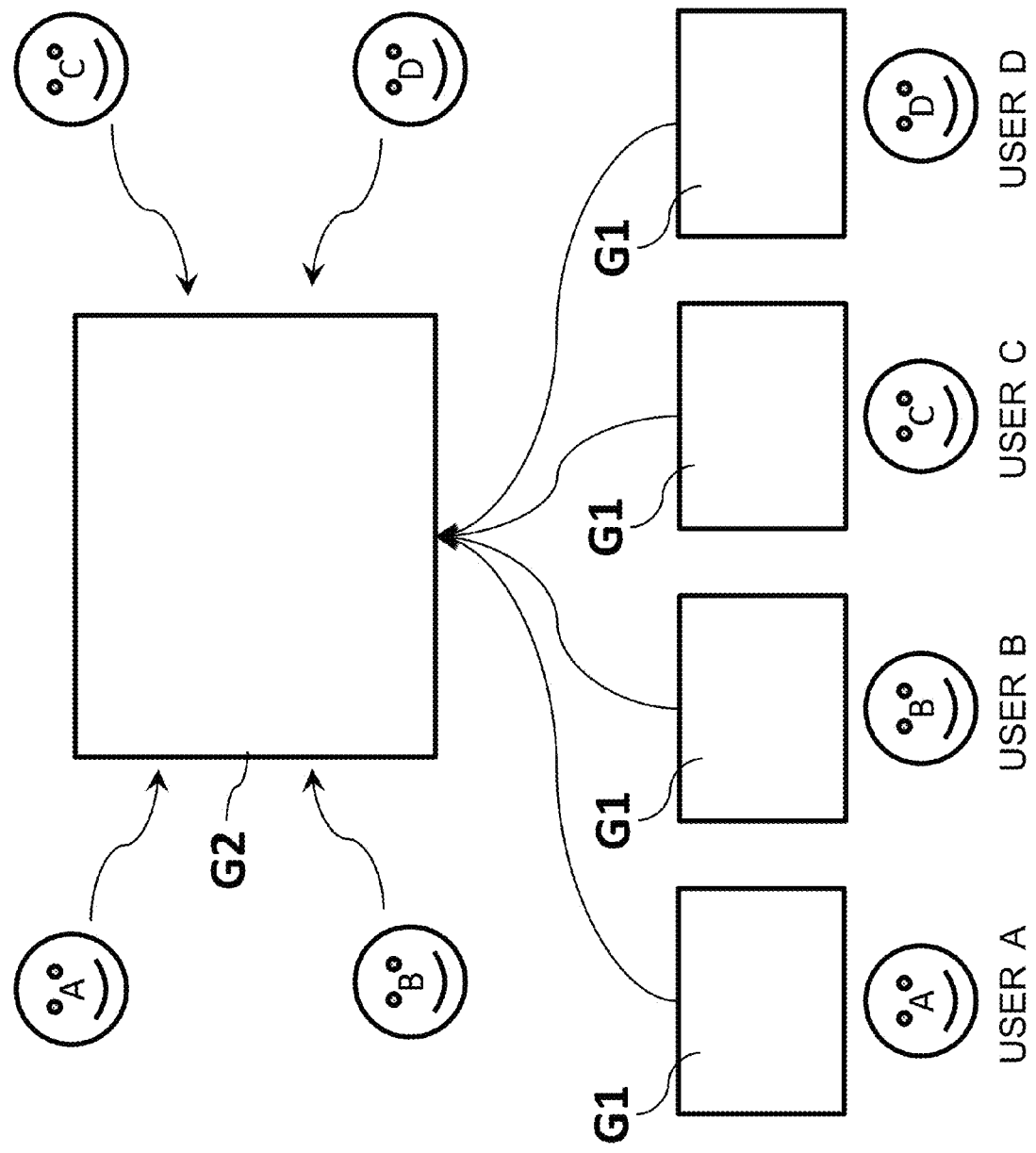
FIG. 9 is a diagram illustrating a relation between a home game space and a battle game space.

As shown in FIG. 9, the game space G in at least one embodiment includes home game spaces G1 and a battle game space G2. The home game space G1 is a game space that is associated with one of a plurality of users A to D and in which only the user A to D associated with the home game space G1 can arrange game objects. The battle game space G2 is a game space shared by the plurality of users A to D through a network. The plurality of users A to D can arrange game objects respectively associated with the users A to D in the battle game space G2. Each of the users A to D can switch the home game space G1 and the battle game space G2 displayed in the user terminals 100 with predetermined user action.

In at least one embodiment, in-game information for determining victory and defeat in a battle such as a population is defined as game points. In-game information associated with a predetermined user or a predetermined game object and necessary for advantageously advancing a game such as coins and various items and in-game information associated with game objects and necessary for operating the game objects (e.g., information such as power consumption and presence or absence of occurrence of fire) are defined as game parameters. Note that the game points and the game parameters may at least partially overlap. In determining victory and defeat in a battle on the basis of the game points, a part of the game parameters may be referred to.

[1. Game Advance Processing in the Home Game Space]

A flow of game advance processing in the home game space G1 is explained in detail with reference to FIGS. 10 to 18. First, processing for giving game points to a user by arranging a building serving as a game object in the home game space G1 is explained with reference to FIGS. 10 to 13. Subsequently, processing for giving a game parameter to the user according to user action on the building arranged in the home game space G1 is explained. Further, processing for making it possible to use, in the battle game space G2, the building in the home game space G1 is explained with reference to FIGS. 17 and 18. FIGS. 12, 13, 15, and 16 are flowcharts for explaining processing of the game system for causing a computer to execute the functions. FIGS. 10, 11, 14, 17, and 18 show examples of the home game space G1.

Figure 10:
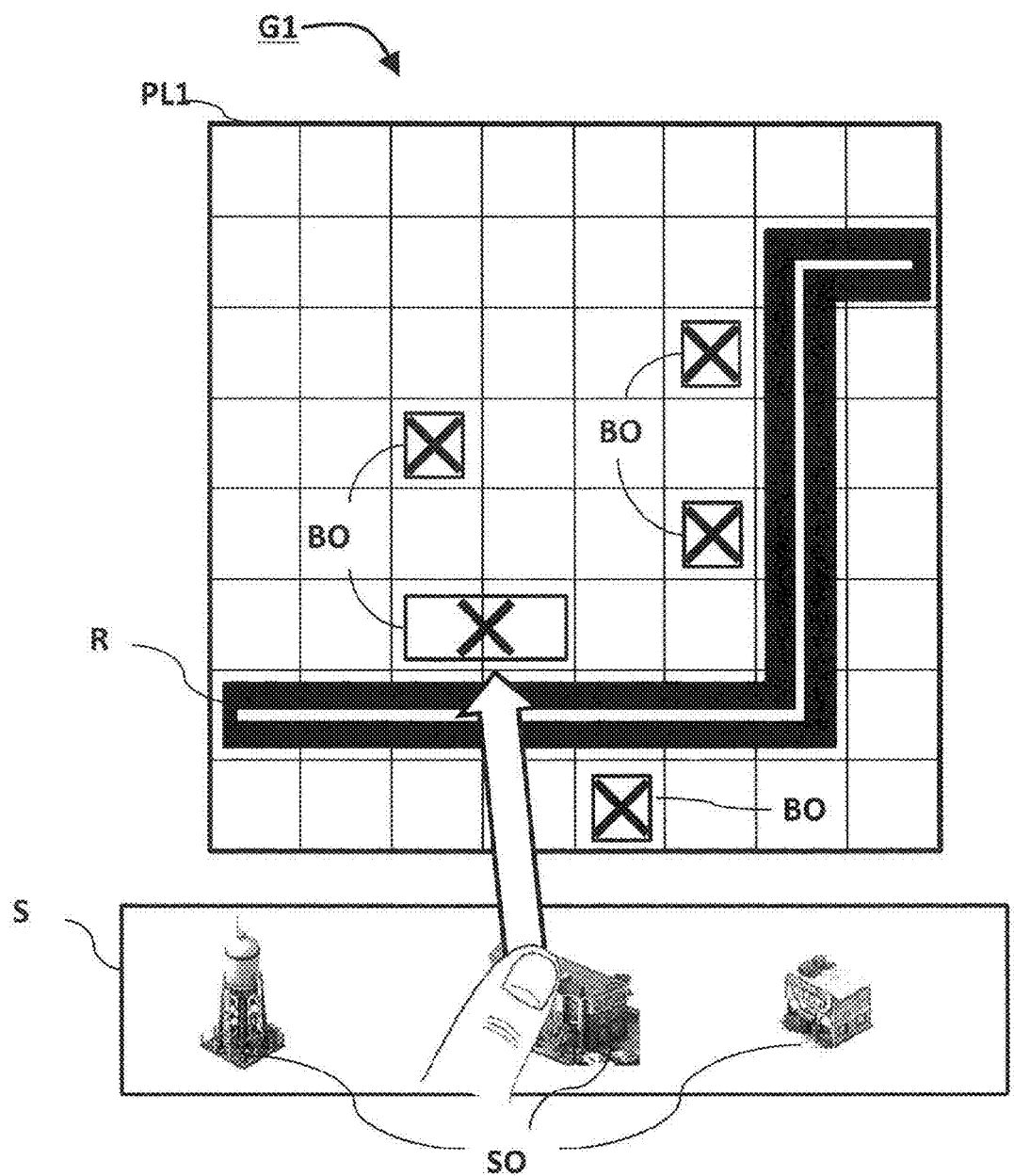
FIG. 10 is a diagram illustrating an example of the home game space.
Figure 12:
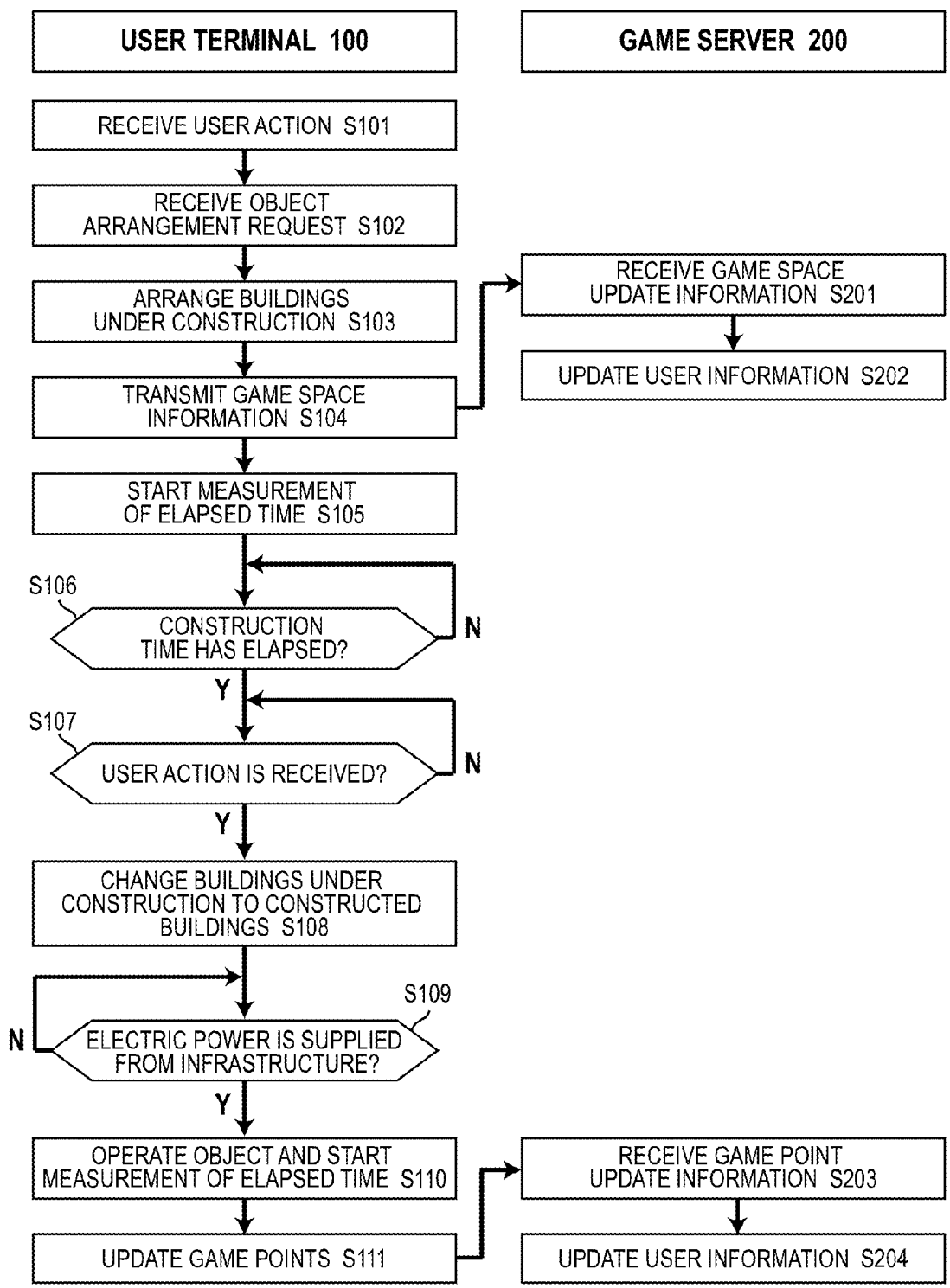
FIG. 12 is a flowchart illustrating processing in the game system in at least one embodiment.

As shown in FIGS. 10 and 12, the user presses a predetermined object for a long time and selects the predetermined object from shop objects SO included in a shop S displayed on the display unit 132 of the user terminal 100 and drags the predetermined object to a predetermined position on a plane PL1 in the home game space G1. In at least one embodiment, as explained below, in terms of a game scenario, progressiveness of a game may be improved by causing the user to arrange the selected object on the basis of a road object R arranged on the plane PL1. Note that the road object R may be arranged as an initial state or may be arranged by the user according to game advance.

Consequently, the action-receiving unit 111 detects action on the input unit 131 from the user (S101) and receives the action as an object arrangement request for arranging an object in the home game space G1 (S102). Buildings under construction BO (a first state) are arranged on the plane PL1 on the basis of the object arrangement request (S103). The user terminal 100 transmits, to the game server 200, game space information indicating that the objects are arranged in the home game space G1 (S104). The game server 200 receives information concerning the object arranged by the user (S201), updates the user management table 300 on the basis of the information, and synchronizes the user management table 300 with the information in the user terminal 100 (S202).

When the buildings under construction BO are arranged on the plane PL1, the timer unit 113 starts measurement of an elapsed time (S105). When the elapsed time of the buildings under construction BO exceeds a construction time set for the objects (S106) and user action (e.g., tap operation) on the buildings under construction BO is further received (S107), the buildings under construction BO change to constructed buildings O1 to O5 (S108). Subsequently, it is determined whether electric power is supplied to the constructed objects from an infrastructure (S109). The objects are operated (S110).

Figure 11:
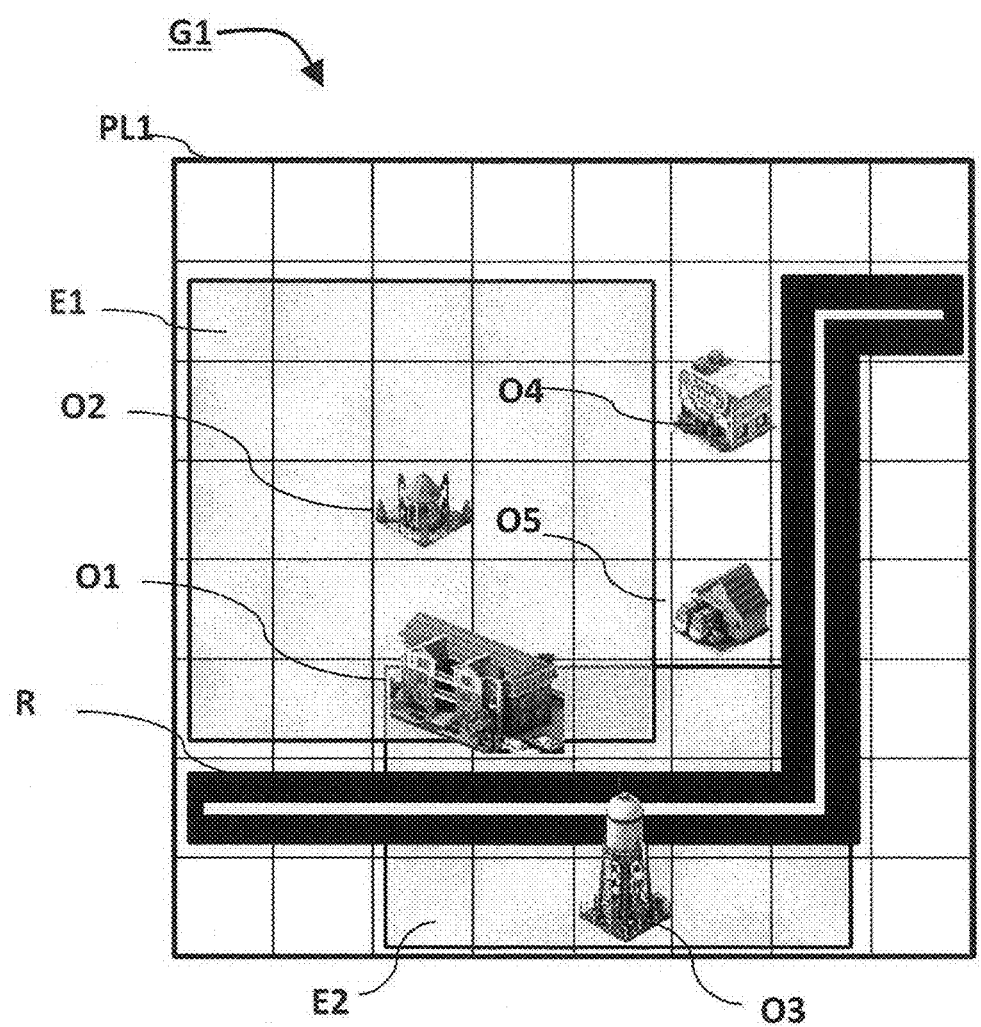
FIG. 11 is a diagram illustrating an example of the home game space.

As shown in FIG. 11, an electric power plant O3, which is an infrastructure, is arranged adjacent to a road R. In this case, electric power can be supplied to objects adjacent to the road R. In at least one embodiment, a condominium O1, a shop O4, and a firehouse O5 are operated by the electric power supplied from the electric power plant O3. Since a park O2 does not need electric power, the park O2 is operated even if the park O2 is not adjacent to the road R.

When the constructed buildings operate, reception of user action on the objects is started. As explained below, the constructed buildings are processed to enable acquisition of game parameters by the objects and reception of activation of skills (a second state). When the buildings under construction change to the constructed buildings, the timer unit 113 starts measurement of elapsed times of the objects O1 to O5 (S110). Game points (e.g., the population P) associated with the objects and acquired by arranging the objects in the home game space G1 are given to the user. Game points associated with the user are updated (S111). At this point, the user terminal 100 transmits to the game server 200 game information including information indicating that the buildings under construction change to the constructed buildings. The game server 200 receives the information indicating that the objects owned by the user change to the constructed buildings and information concerning the game points acquired by operating the constructed buildings (S203), updates the user management table 300 on the basis of the information, and synchronizes the user management table 300 with information in the user terminal 100 (S204).

Note that the constructed buildings may be changed to the buildings under construction again. For example, a population that can be owned and a coin production amount may be increased by extending the buildings under construction or increasing an object level. In this case, the buildings under construction may be changed to the constructed buildings after the extension or the level increase (the same as S108) by changing the constructed buildings to the buildings under construction again and starting measurement of an elapsed time (the same as S105) and receiving user action after the elapse of a construction time (an extension time) necessary for the extension and the level increase (the same as S106 and S107). The series of processing in S109 to S111 and S203 and S204 can be applied to the subsequent game point update processing.

Figure 13:
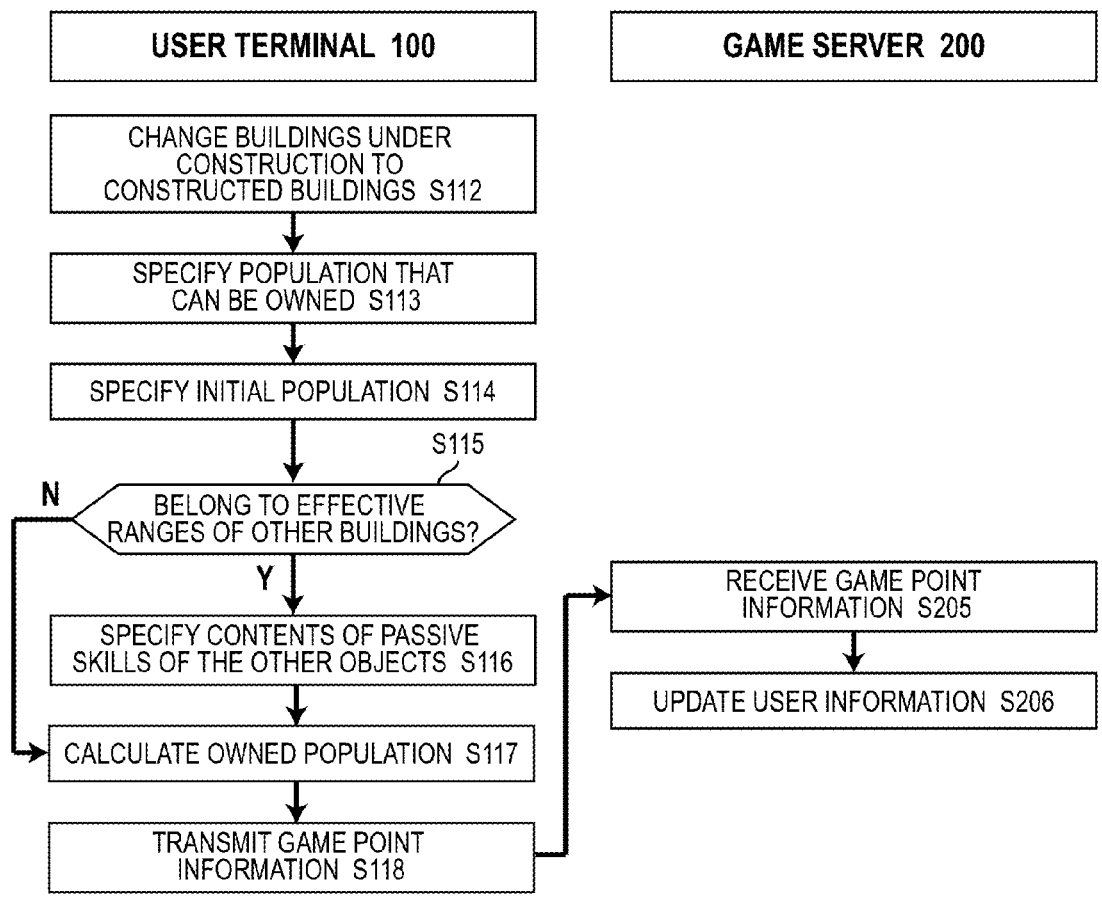
FIG. 13 is a flowchart illustrating processing in the game system in at least one embodiment.

As shown in FIGS. 11 and 13, when the condominium O1, the park O2, the electric power plant O3, the shop O4, and the firehouse O5 serving as the constructed buildings are arranged on the plane PL1 (S112), game points associated with the user are calculated by calculating owned populations of the objects (S117). In at least one embodiment, an object that can own a population is only the condominium O1. First, a population that can be owned by the condominium O1 is specified with reference to the object management table 310 (S113). An initial population that can be owned is specified by arranging the condominium O1 on the plane PL1 (S114).

Subsequently, fluctuation in the population owned in the condominium O1 by skills (passive skills) of the other objects is calculated. First, whether the condominium O1 belongs to effective ranges of other objects is determined (S115). The condominium O1 is specified as belonging to an effective range E1 of the park O1 and an effective range E2 of the electric power plant O3. After contents of the passive skills of the park O2 and the electric power plant O3 are specified (S116), an owned population of the condominium O1 is calculated by adding a population increase due to the passive skill of the park O2 from the initial population and subtracting a population decrease due to the passive skill of the electric power plant O3 (S117). The user terminal 100 transmits the owned population obtained by arranging the condominium O1 in the home game space G1 to the game server 200 as game point information (S118). The game server 200 receives information concerning the game points (S205) and updates the user management table 300 on the basis of the information (S206).

Figure 14:
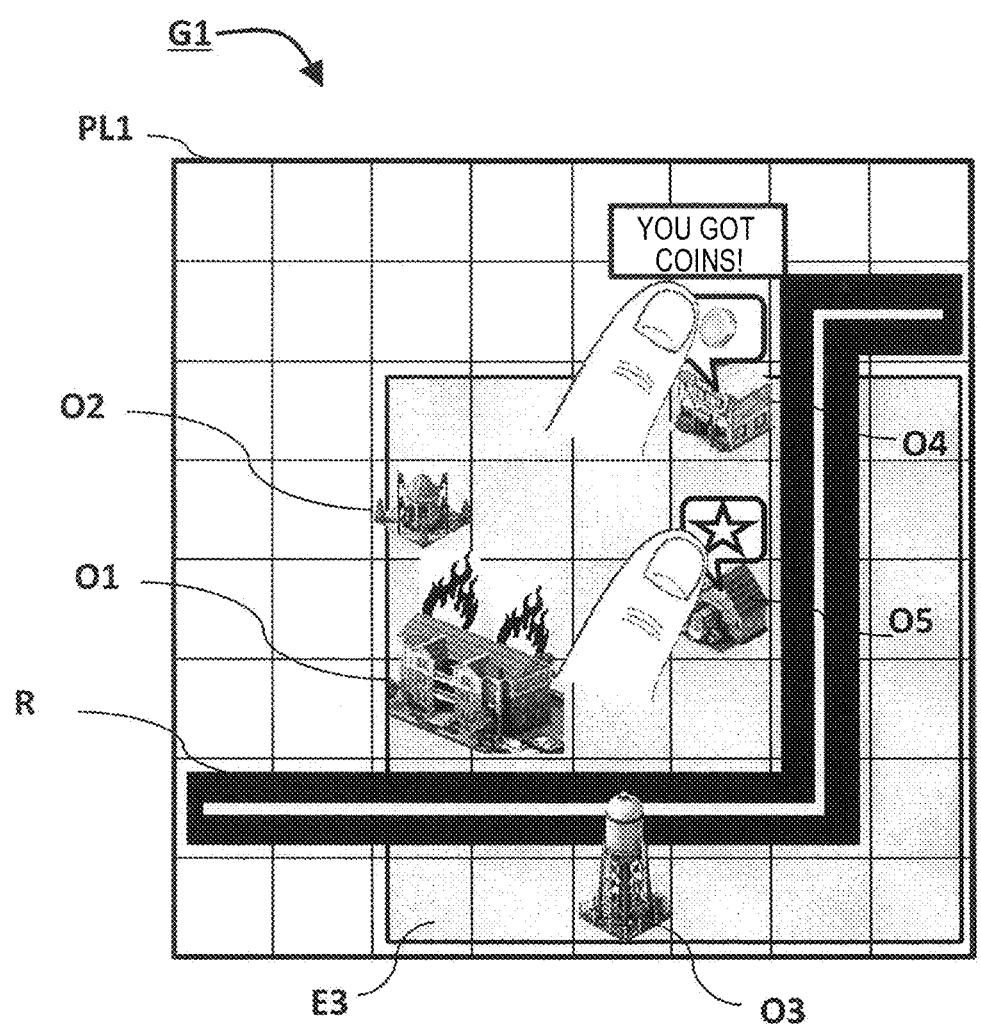
FIG. 14 is a diagram illustrating an example of the home game space.
Figure 15:
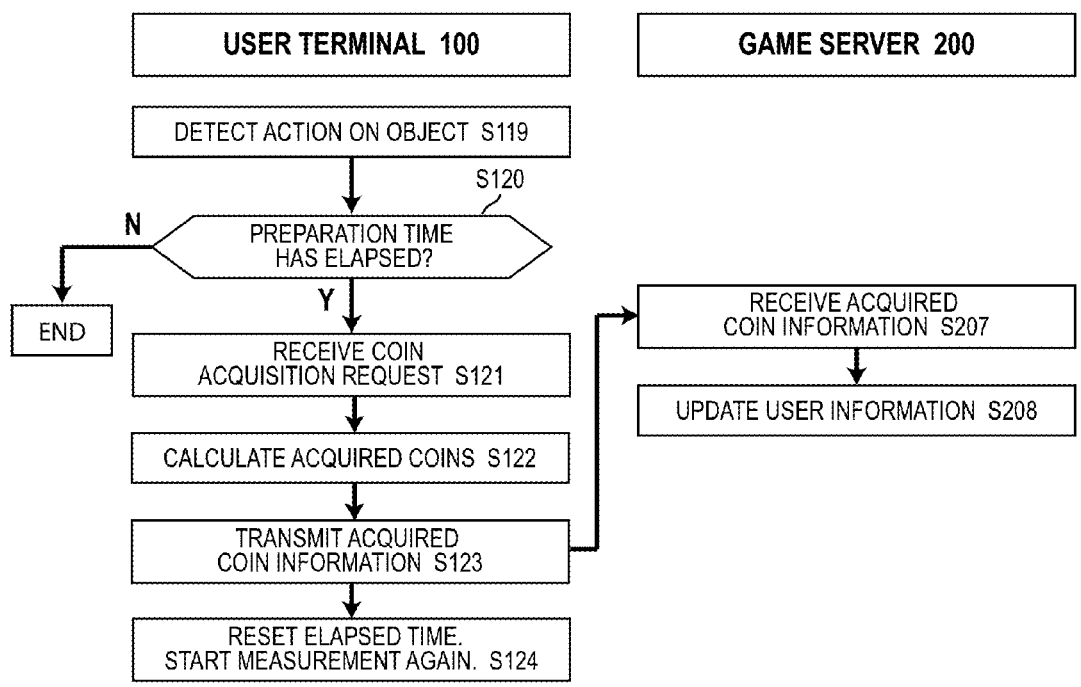
FIG. 15 is a flowchart illustrating processing in the game system in at least one embodiment.
Figure 16:
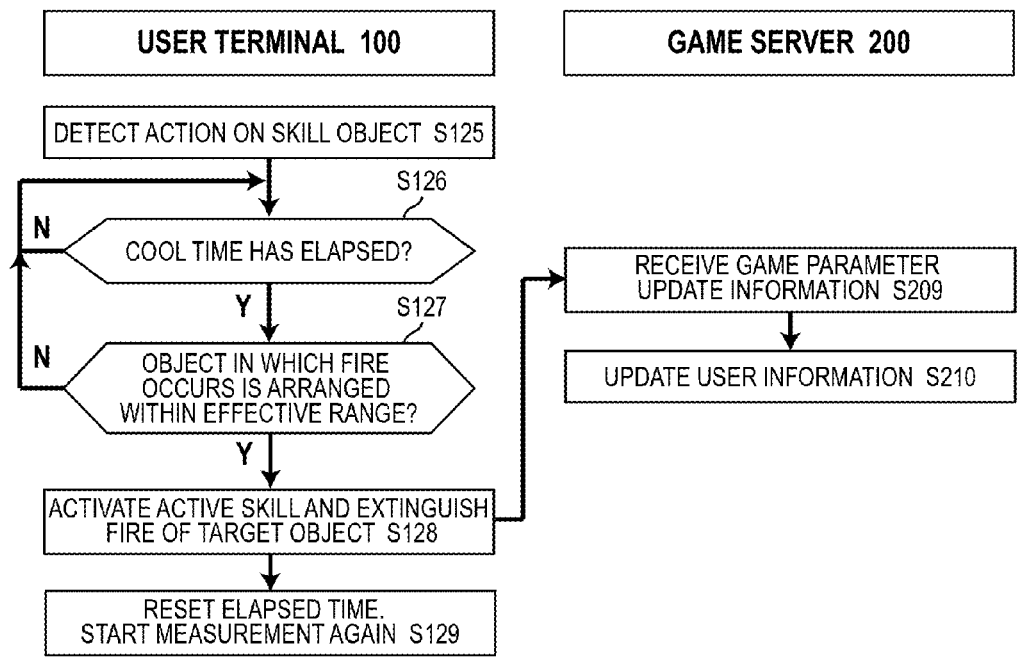
FIG. 16 is a flowchart illustrating processing in the game system in at least one embodiment.

Further, as shown in FIGS. 14 to 16, processing for skill (active skill) activation for giving game parameters to the user is executed according to user action on the buildings arranged on the plane PL1. As shown in FIG. 15, when the user taps the shop O4 arranged on the plane PL1, the action-receiving unit 111 of the user terminal 100 detects that user action is input (S119). The terminal-determining unit 114 determines with reference to an elapsed time of the shop O4 stored in the user management table 300 whether a preparation time for making it possible to acquire the coin C1 from the shop O4 has elapsed (S120). When determining Yes, the terminal-determining unit 114 receives the action as a request for acquiring a coin from the shop O4 (S121). At this point, indicators indicating that a coin can be acquired attached to the objects are erased. The user can visually recognize that the coin acquisition request is received. Subsequently, the terminal-processing unit 112 calculates, on the basis of the elapsed time, a game parameter value such as an amount of coins to be acquired (S122). The communication unit 140 of the user terminal 100 transmits, to the game server 200, game information indicating that a game parameter having a predetermined value is given to the user (S123). The processing device 220 of the game server 200 receives information concerning the game parameters given to the user (S207) and updates the user management table 300 on the basis of the information (S208).

As shown in FIG. 16, when the action-receiving unit 111 of the user terminal 100 detects user action on the firehouse O5, which is a skill object (S125), the terminal-determining unit 114 determines, with reference to an elapsed time after the firehouse O5 is changed to a constructed object or an elapsed time after a skill is activated once, whether the elapsed time has exceeded a cool time (S126). Note that it is specified in advance through reference to the skill management table 330 that skill content associated with the firehouse O5 is a skill for extinguishing fire of a building object present within an effective range. When the elapsed time exceeds the cool time, the user terminal 100 receives user action and specifies an effective range E3 of the firehouse O5. The terminal-determining unit 114 determines whether an object on fire is arranged within the effective range E3 (S127). When the condominium O1 arranged within the effective range E3 is on fire, the terminal-processing unit 112 specifies the condominium O1 as a target object and performs processing to extinguish the fire of the condominium O1 with the skill of the firehouse O5 (S128). The communication unit 140 of the user terminal 100 transmits to the game server 200 information concerning game points and a game parameter obtained by extinguishing the fire of the condominium O1. The game server 200 receives the information (S209), updates the user management table 300, and synchronizes the user management table 300 with information in the user terminal 100 (S210). When the skill of the firehouse O5 is activated, the firehouse O5 enters the cool time. The timer unit 113 resets the elapsed time in the user management table 300, starts measurement again, and performs processing such that the skill cannot be activated again before the elapsed time exceeds the cool time (S129).

Figure 17:
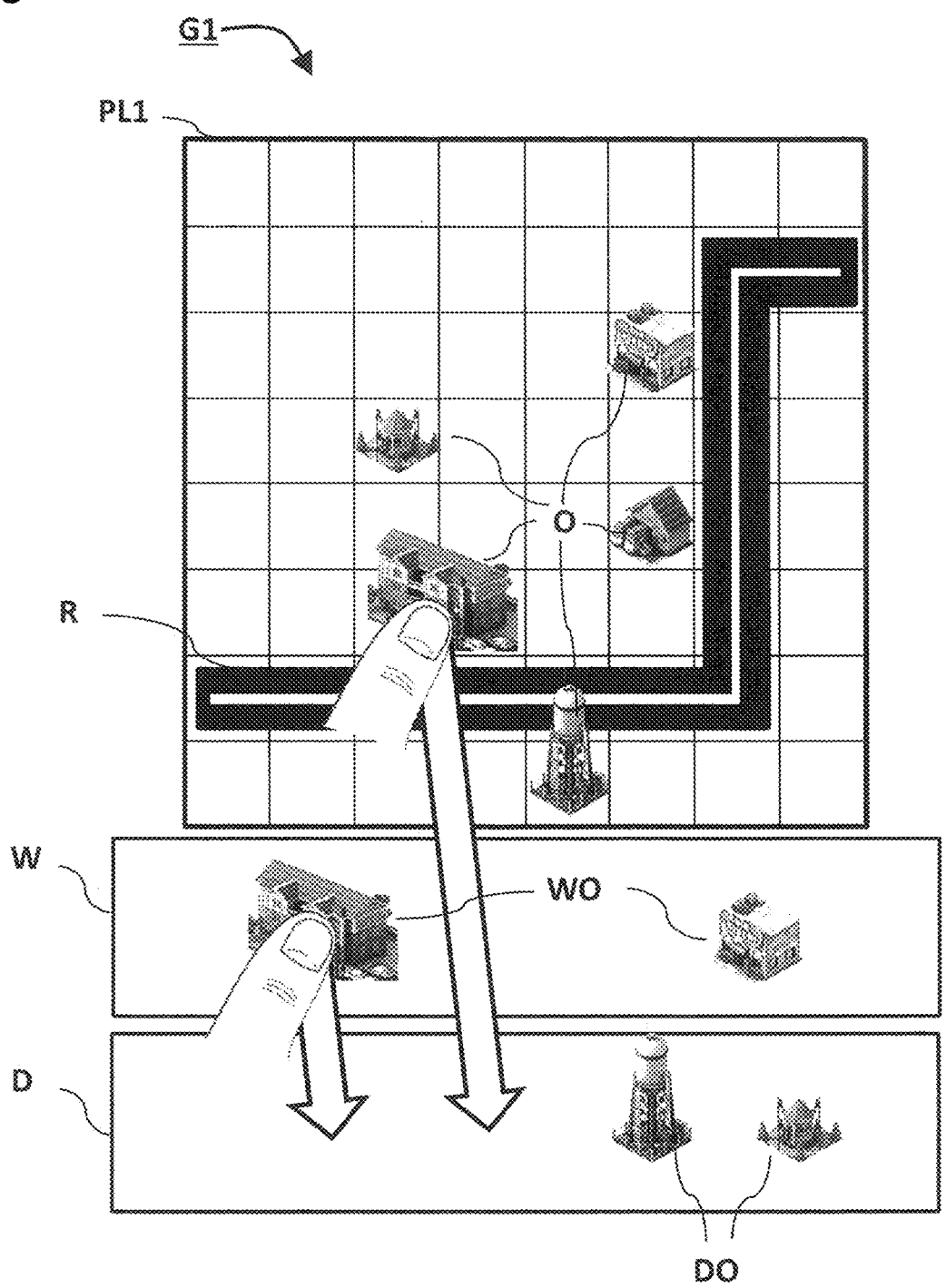
FIG. 17 is a diagram illustrating an example of the home game space.
Figure 18:
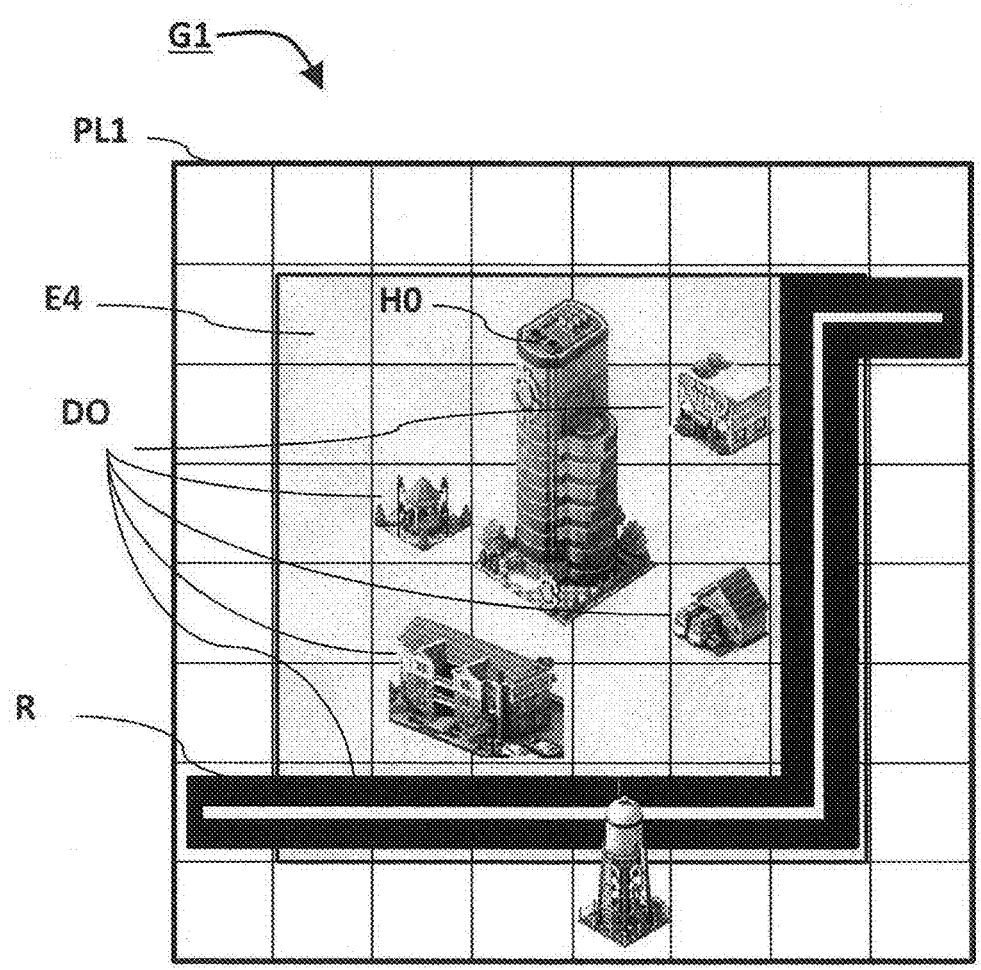
FIG. 18 is a diagram illustrating an example of the home game space.

As shown in FIGS. 17 and 18, a building object arranged in the home game space G1 and objects WO stored in a warehouse W, in which the user stores objects that cannot be arranged in the home game space G1, can be selected as deck objects DO that can be used in the battle game space G2.

As shown in FIG. 17, the user can register, as the deck objects DO, the building object O and the road object R arranged on the plane PL1 by pressing the building object O and the road object R for a long time and dragging the building object O and the road object R to a deck D.

As shown in FIG. 18, a head office H0, which is an object for selecting the deck objects DO, may be arranged on the plane PL1. Objects arranged within an effective range E4 of the head office H0 are registered as the deck objects DO. The deck objects DO can be reflected on the battle game space G2 explained below in a state in which an arrangement relation of the deck objects DO is maintained.

[2. Game Advance Processing in the Battle Game Space]
[2-1. Switching from the Home Game Space to the Battle Game Space]

Figure 19:
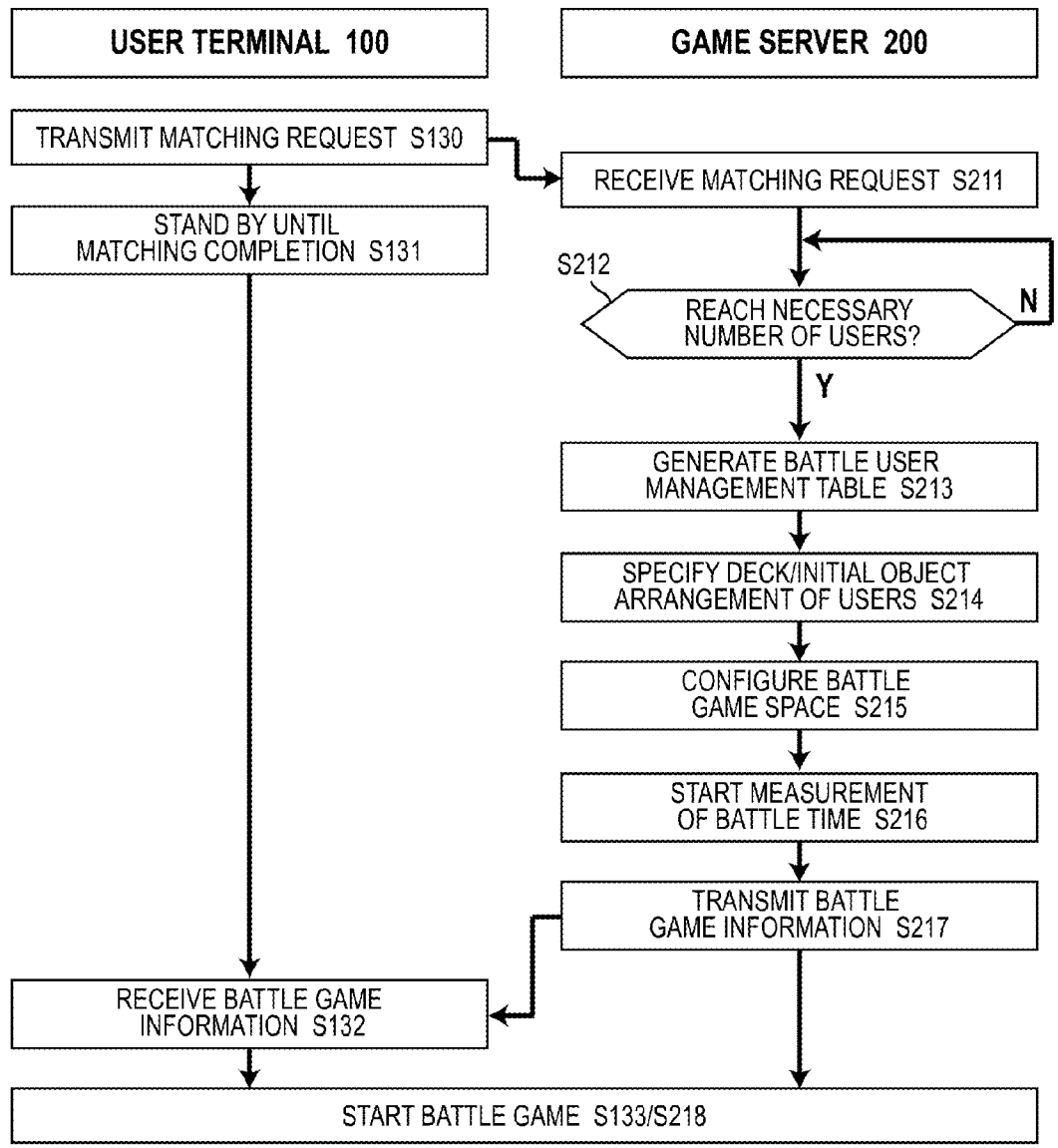
FIG. 19 is a flowchart illustrating processing in the game system in at least one embodiment.

A processing flow in the game system 1 for switching the home game space G1 to the battle game space G2 is explained with reference to FIG. 19. When a matching request for starting a battle game is transmitted from a certain user terminal 100 to the game server 200 (S130), the receiving unit 221 of the game server 200 receives the matching request (S211), generates a lobby for waiting for other battle users, and registers the users as users waiting to be matched. The user terminal 100 is in a standby state until matching of a battle opponent is completed (S131).

The matching unit 224 of the game server 200 receives a matching request from the other user terminals 100 as well. When determining that users waiting to be matched specified in the lobby reach a predetermined number (S212), the matching unit 224 generates a battle user management table 340 shown in FIG. 20 (S213). In the battle user management table 340, game parameters such as owned coins and owned items are not taken over (are varied) from the home game space G1 and an initial state common to all users is set. On the other hand, a part of game parameters such as an owned diamond is taken over from (matched with) the home game space G1. As owned objects, the deck objects DO set in the home game space G1 are set. At this point, when the deck objects DO are selected by moving the deck object DO to the deck D as shown in FIG. 17, in an initial state, all the deck objects DO are stored in the warehouse W. On the other hand, when the deck objects DO are selected on the basis of an effective range of the head office H0 as shown in FIG. 18, initial arrangement positions in the battle game space G2 of the deck objects DO are specified (S214).

Subsequently, the game server 200 configures the battle game space G2 shared among battle users (S215) and starts measurement of a battle time with the measuring unit 225 (S216) and thereafter transmits battle game information including information concerning the battle game space G2 and the battle time to the user terminals 100 (S217), whereby a battle game is started (S218). The user terminals 100 receive the battle game information (S132), whereby the battle game is started (S133). The battle time is time in which the battle game is performed in the battle game space G2. The battle time is processed such that the battle game is ended when a predetermined battle time elapses after a battle start and game objects are not arranged in the battle game space G2. The battle game information includes information concerning time when the measurement of the battle time is started and time when the battle is ended. Therefore, an elapsed time in the battle game space G2 is shared among the user terminals 100. The battle time may be selectable from a plurality of battle times having different lengths.

A flow of basic game advance processing in the battle game space G2 is explained in detail with reference to FIGS. 21 to 34. Processing for giving game points to a user by arranging a building serving as a game object in the battle game space G2 according to an example of the game advance processing is explained with reference to FIGS. 21 to 26. An example of game elements for improving the gameplay of a battle game realized in the battle game space G2 according to another example of the game advance processing is explained with reference to FIGS. 27 to 33. Common processing for determining a winner of a battle game on the basis of game points given to users after the end of the battle game is explained with reference to FIG. 34. FIGS. 22, 26, and 32 to 34 are flowcharts for explaining processing of the game system that causes a computer to execute the functions. FIGS. 21, 23 to 25, and 29 to 31 show examples of the battle game space G2. FIGS. 27 and 28 are examples of a management table for master-managing mob characters, which are a part of the game elements.

[2-2. Game Advance Processing 1 in the Battle Game Space]

Figure 21:
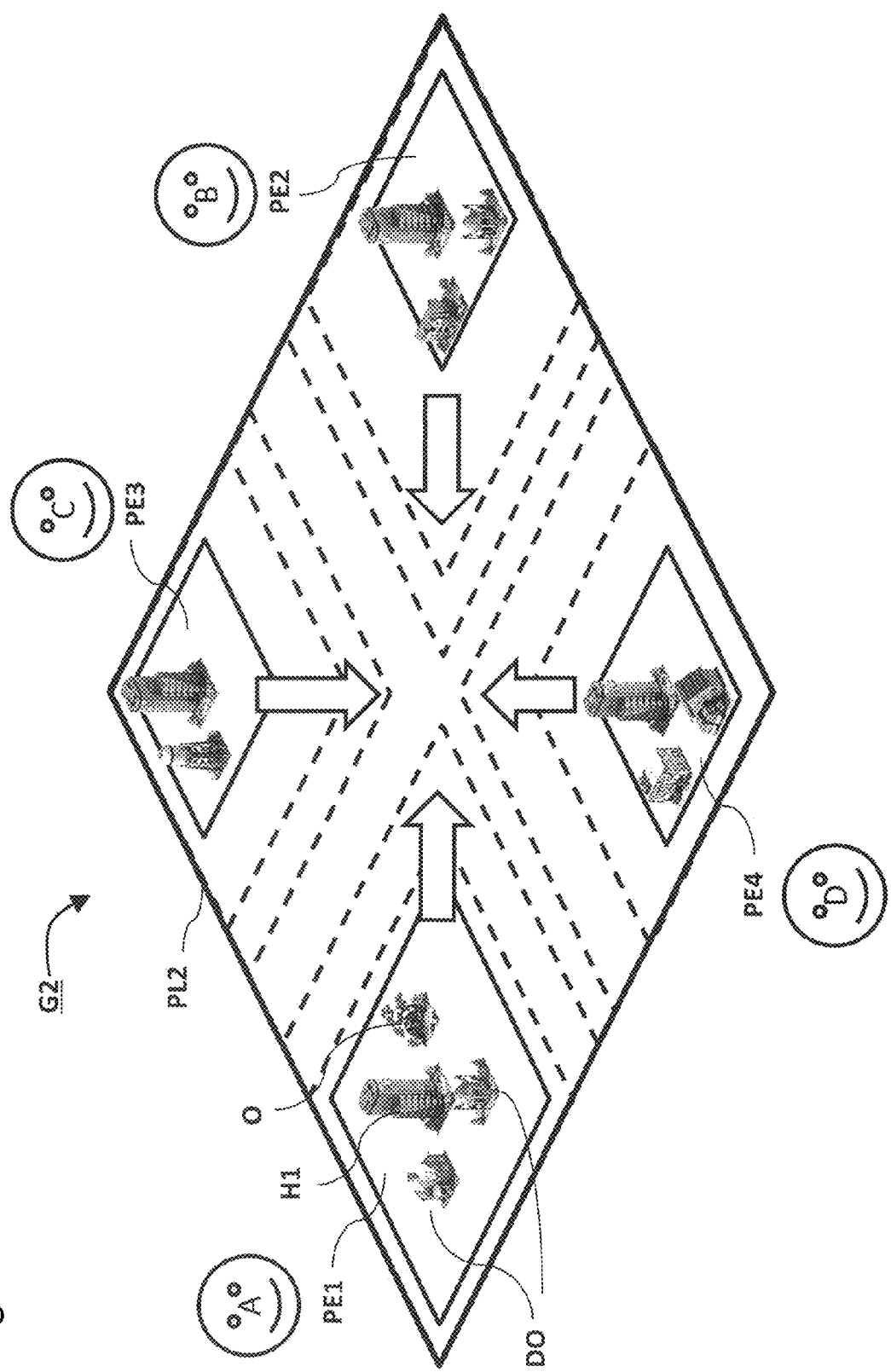
FIG. 21 is a diagram illustrating an example of the battle game space.
Figure 22:
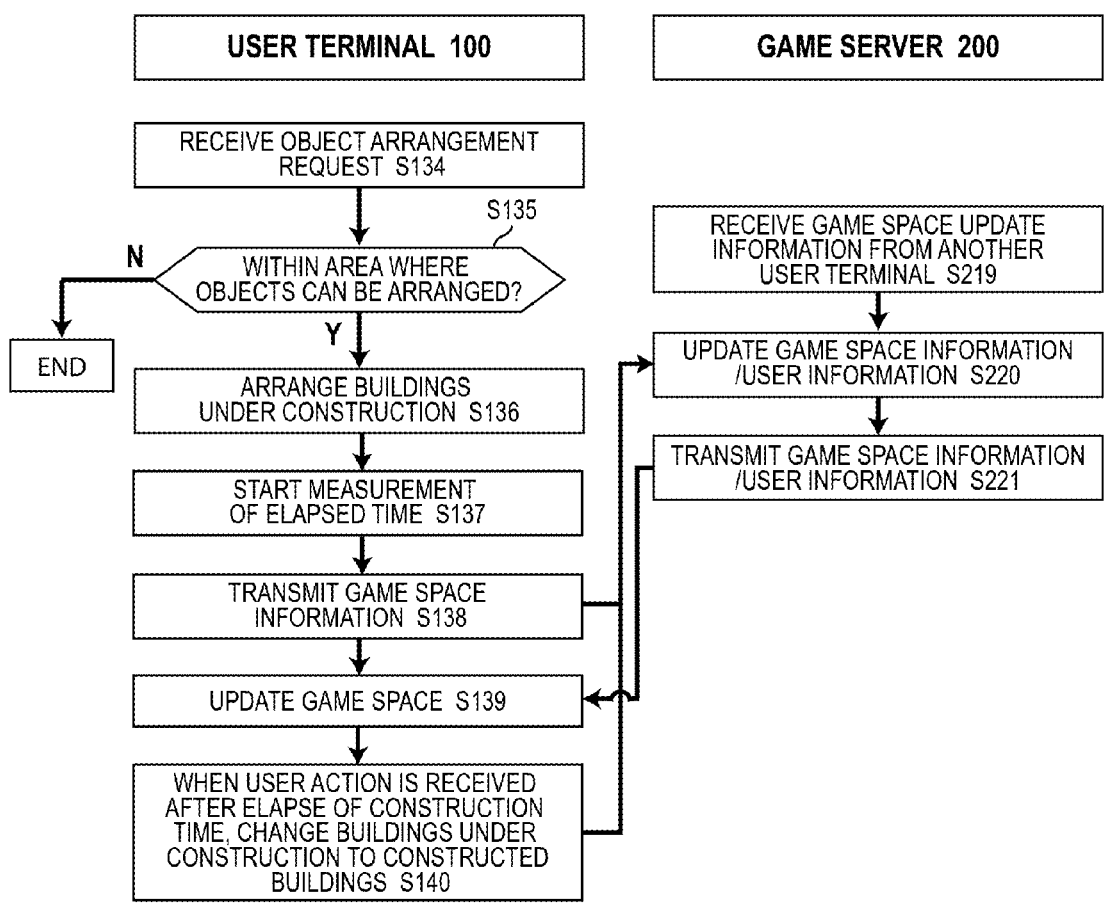
FIG. 22 is a flowchart illustrating processing in the game system in at least one embodiment.

The examples of the game advance processing shown in FIGS. 21 to 26 are explained. When matching of battle users is completed, the battle game space G2 shown in FIG. 21 is displayed on the display units 132 of the user terminals 100. A plane PL2 in the battle game space G2 is associated with the users A to D. The users A to D can arrange game objects on the plane PL2. Meanwhile, the plane PL2 includes a first area PE1 associated with the user A, a second area PE2 associated with the user B, a third area PE3 associated with the user C, and a fourth area PE4 associated with the user D. The user A can arrange the game objects O only in the first area PE1. The user B can arrange the game objects O only in the second area PE2. The user C can arrange the game objects O only in the third area PE3. The user D can arrange the game objects O only in the fourth area PE4. Note that only the first area PE1 is visibly displayed on the display unit 132 of the user terminal 100-1 of the user A. Only the second area PE2 is visibly displayed on the display unit 132 of the user terminal 100-2 of the user B. Only the third area PE3 is visibly displayed on the display unit 132 of the user terminal 100-3 of the user C. Only the fourth area PE4 is visibly displayed on the display unit 132 of the user terminal 100-4 of the user D. Therefore, the user A cannot visually recognize the second area PE2 to the fourth area PE4.

The first area PE1 to the fourth area PE4 include head offices H1 to H4 associated with the users A to D. As shown in FIG. 18, when the objects arranged within the effective range E4 of the head office H0 in the home game space G1 are registered as the deck objects DO, at the start of the battle game, the deck objects DO may be reflected on regions including the head offices H1 to H4 in the first area PE1 to the fourth area PE4. Consequently, it is possible to reflect the deck objects DO arranged within the effective range E4 at the start of the battle game in the battle game space G2 in a state in which an arrangement relation among the deck objects DO is maintained. Convenience of the user is improved.

As in the home game space G1, the users A to D can arrange the game objects O on the plane PL2 (the first area PE1 to the fourth area PE4). As in an example shown in FIG. 10, the users A to D press, for a long time, predetermined objects among the shop objects SO included in the shops S displayed on the user terminals 100 and select the predetermined objects. The users A to D drag the predetermined objects to predetermined positions on the plane PL2 in the battle game space G2. Consequently, the action-receiving unit 111 detects action on the input unit 131 from the user and receives the action as an object arrangement request for arranging the objects in the battle game space G2 (S134 in FIG. 22). When the terminal-determining unit 114 determines that the predetermined positions are present in the first area PE1 to the fourth area PE4 where the user can arrange the objects (Y in S135), the terminal-processing unit 112 arranges the buildings under construction BO (the first state) on the plane PL2 on the basis of the object arrangement request (S136). When the buildings under construction BO are arranged on the plane PL2, the timer unit 113 starts measurement of an elapsed time (S137). The user terminal 100 transmits, to the game server 200, game space information indicating that the objects are arranged in the battle game space G2 and indicating time when the measurement of the elapsed time is started (S138).

The game server 200 receives the information concerning the objects arranged by the users A to D (S219) and updates the battle user management table 340 on the basis of the information (S220). Consequently, the game space information based on the arrangement of the objects arranged by the users in the battle game space G2 and owned game points and game parameters of the battle users A to D are unitarily managed. The game server 200 transmits the game space information and the user information to the user terminals 100 (S221), whereby the game space information and the user information are shared among the user terminals 100 and the battle game space G2 is updated on a real time basis.

When the elapsed time of the buildings under construction BO exceeds the construction time set for the objects and the buildings under construction BO further receive user action (e.g., tap operation), the buildings under construction BO change to the constructed buildings O (S140). Information indicating that the constructed buildings O are arranged in the battle game space G2 is transmitted to the game server 200 as game space information and shared by the other user terminals 100 as well (S220 and S221).

Figure 23:
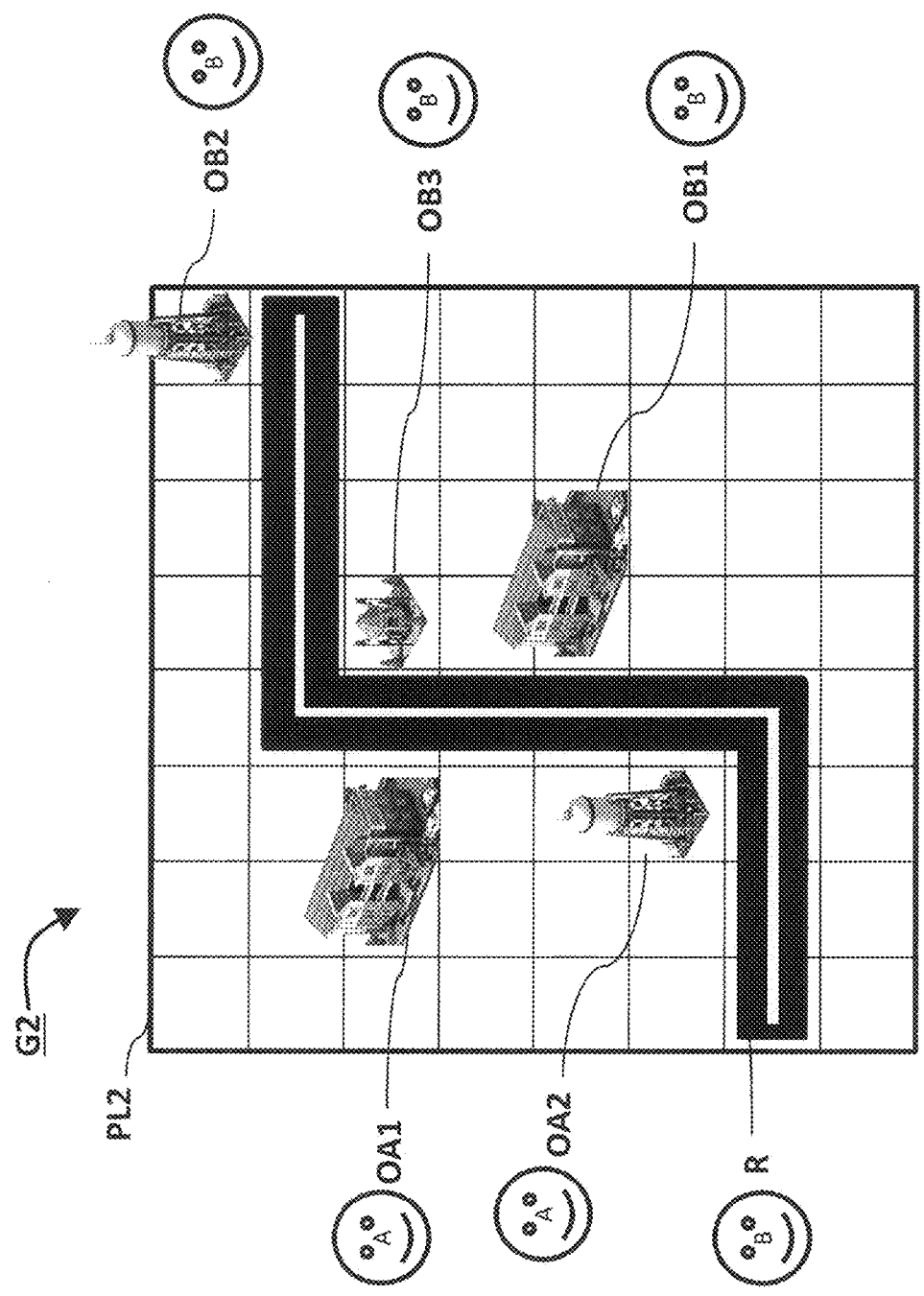
FIG. 23 is a diagram illustrating an example of the battle game space.
Figure 24:
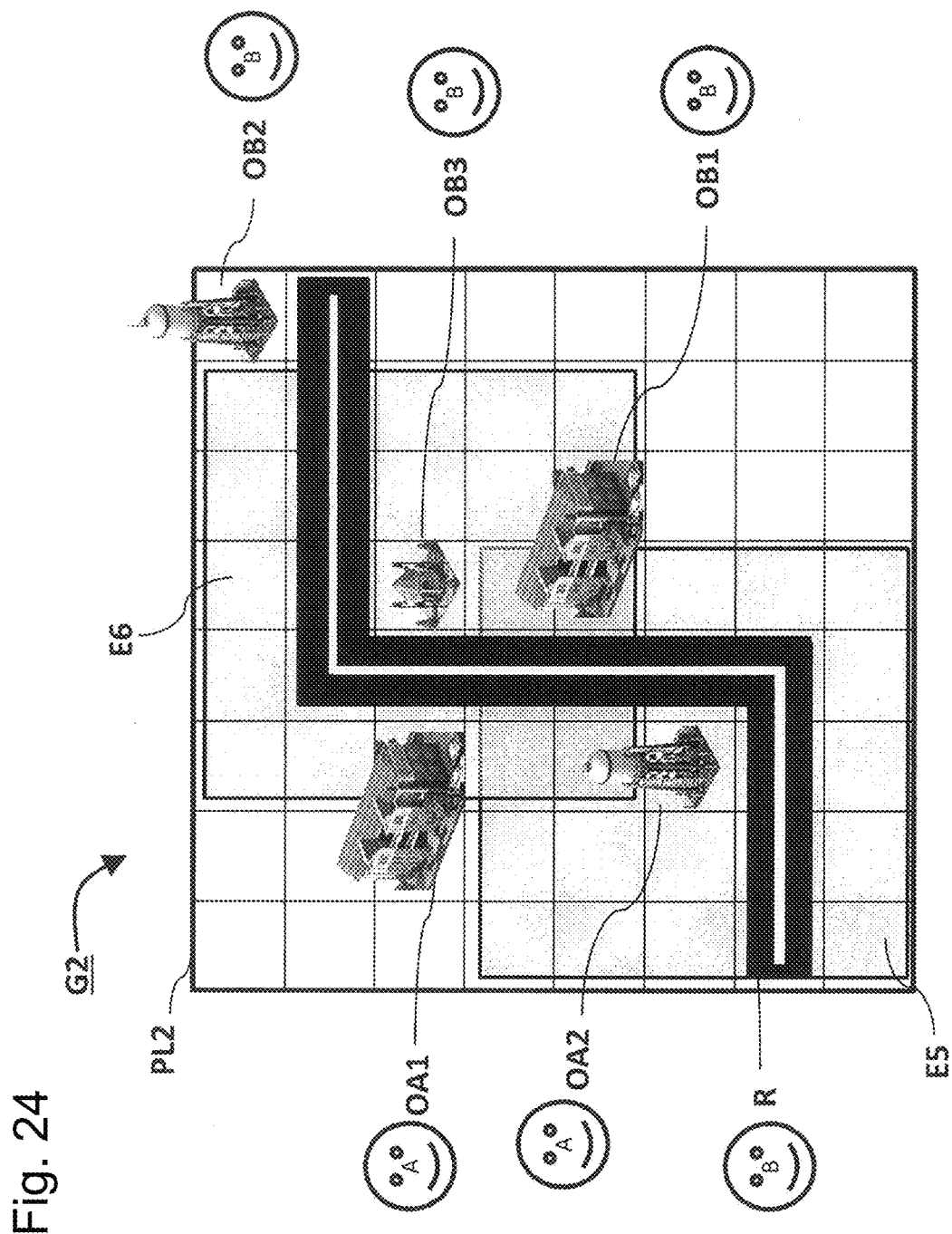
FIG. 24 is a diagram illustrating an example of the battle game space.

As shown in FIG. 23, when the terminal-processing unit 112 arranges constructed buildings OA1, OA2, and OB1 to OB3 in the battle game space G2 (S140 in FIG. 26), the terminal-determining unit 114 determines whether electric power is supplied to the constructed objects from an infrastructure (S141). A condominium OA1 and an electric power plant OA2 are associated with the user A. A condominium OB1, an electric power plant OB2, a park OB3, and the road R are associated with the user B. The electric power plant OA1 and the electric power plant OB2, which are the infrastructure, are arranged adjacent to the road R. Therefore, electric power serving as a game parameter is supplied to objects adjacent to the road R.

In at least one embodiment, the road R may be shared among the users. Sharing the road R among the users means, even when not only a building object of a user associated with road R (who arranges a road object) but also a building object associated with the road R (adjacent to the road object) is associated with other users, it is possible to supply electric power to the building object via the road R. Specifically, the electric power plant OA2 supplies electric power to the objects associated with the users A and B via the road R associated with the user B. The electric power plant OB2 supplies electric power to the objects associated with the users A and B via the road R associated with the user B. Therefore, the condominium OA1 is operated by electric power supplied from the electric power plants OA1 and OB2. The condominium OB1 is operated by electric power supplied from the electric power plants OA1 and OB2. Note that, since the park OB3 does not need electric power, the park OB3 is operated irrespective of whether the park OB3 is adjacent to the road R. In this way, a part of objects of the road R can be shared among the users. Consequently, the users need to devise game object arrangement of the users taking into account object arrangement of a battle opponent. It is possible to improve importance of strategic thinking in town development elements and the like.

When the constructed buildings OA1, OA2, and OB1 to OB3 operate, the action-receiving unit 111 starts reception of user action on the objects. As explained below, the constructed buildings are processed to enable acquisition of game parameters by the objects and reception of activation of skills (the second state). When the buildings under construction change to the constructed buildings, the timer unit 113 starts measurement of elapsed times of the objects OA1, OA2, and OB1 to OB3 (S142). Game points (e.g., the population P) associated with the objects and acquired by arranging the objects in the battle game space G2 are given to the user.

At this point, by calculating owned populations of the objects (S147), game points associated with the user are calculated. In at least one embodiment, objects that can own populations are the condominium OA1 and the condominium OA2. First, populations that can be owned by the condominiums OA1 and OB2 are specified with reference to the object management table 310 (S143). Initial populations that can be owned are specified by arranging the condominiums OA1 and OB2 on the plane PL2 (S144).

Subsequently, fluctuation in the populations owned in the condominiums OA1 and OB2 is calculated by the skills of the other objects. First, whether the condominiums OA1 and OB2 belong to effective ranges of other objects is determined (S145). At this point, effective ranges of objects having the passive skills among the constructed buildings OA1, OA2, and OB1 to OB3 arranged in the plane PL2 are specified by referring to the object management table 310 and the passive skill management table 320. Objects, at least a part of which is arranged within the effective ranges, are specified. In at least one embodiment, the condominium OB1 is arranged within an effective range E5 of the electric power plant OA2. A part of the condominium OA1 and a part of the condominium OB1 are arranged within an effective range E6 of the park OB3.

The condominium OA1 is specified as belonging to the effective range E6 of the park OB3 (Y in S145). Therefore, after content of the passive skill of the park OB3 is specified (S146), a population increase due to the passive skill of the park OB3 from the initial population is added and an owned population of the condominium OA1 is calculated (S147). The condominium OB1 is specified as belonging to the effective range E5 of the electric power plant OA2 and the effective range E6 of the park OB3 (Y in S145). Therefore, after contents of the passive skills of the electric power plant OA2 and the park OB3 are specified (S146), a population increase due to the passive skill of the park OB3 from the initial population is added and a population decrease due to the passive skill of the electric power plant OA2 is subtracted, whereby an owned population of the condominium OB1 is calculated (S147). The user terminal 100-1 associated with the user A transmits an owned population obtained by arranging the condominium OA1 in the game space G to the game server 200 as game point information. The user terminal 100-2 associated with the user B transmits an owned population obtained by arranging the condominium OB1 in the game space G to the game server 200 as game point information (S148). The game server 200 receives the information concerning game points (S222), updates the user management table 300 on the basis of the information, and transmits the information after the update to the user terminals 100 (S223).

At this point, a game point value updated by arranging the objects may coincide with a game point value updated when the objects are arranged in the home game space G1. That is, a population that can be owned by an owning object specified in the battle user management table 340 and the number of owned populations updated by the passive skills are set on the basis of the user management table 300, the object management table 310, and the skill management tables 320 and 330. Consequently, the user can advantageously advance the battle game by bringing up game objects in the home game space G1. It is possible to improve the gameplay in the home game space G1.

Figure 25:
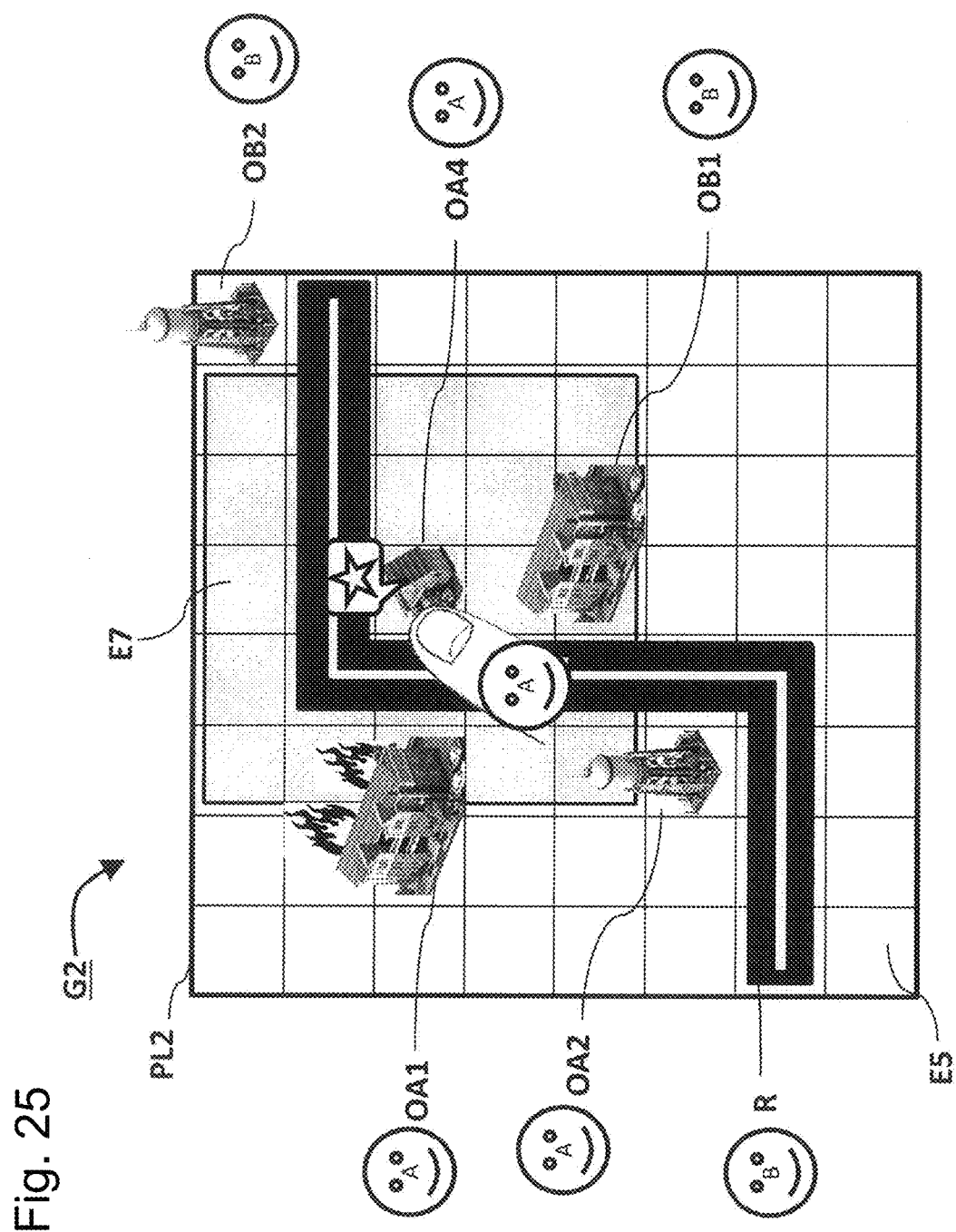
FIG. 25 is a diagram illustrating an example of the battle game space.
Figure 26:
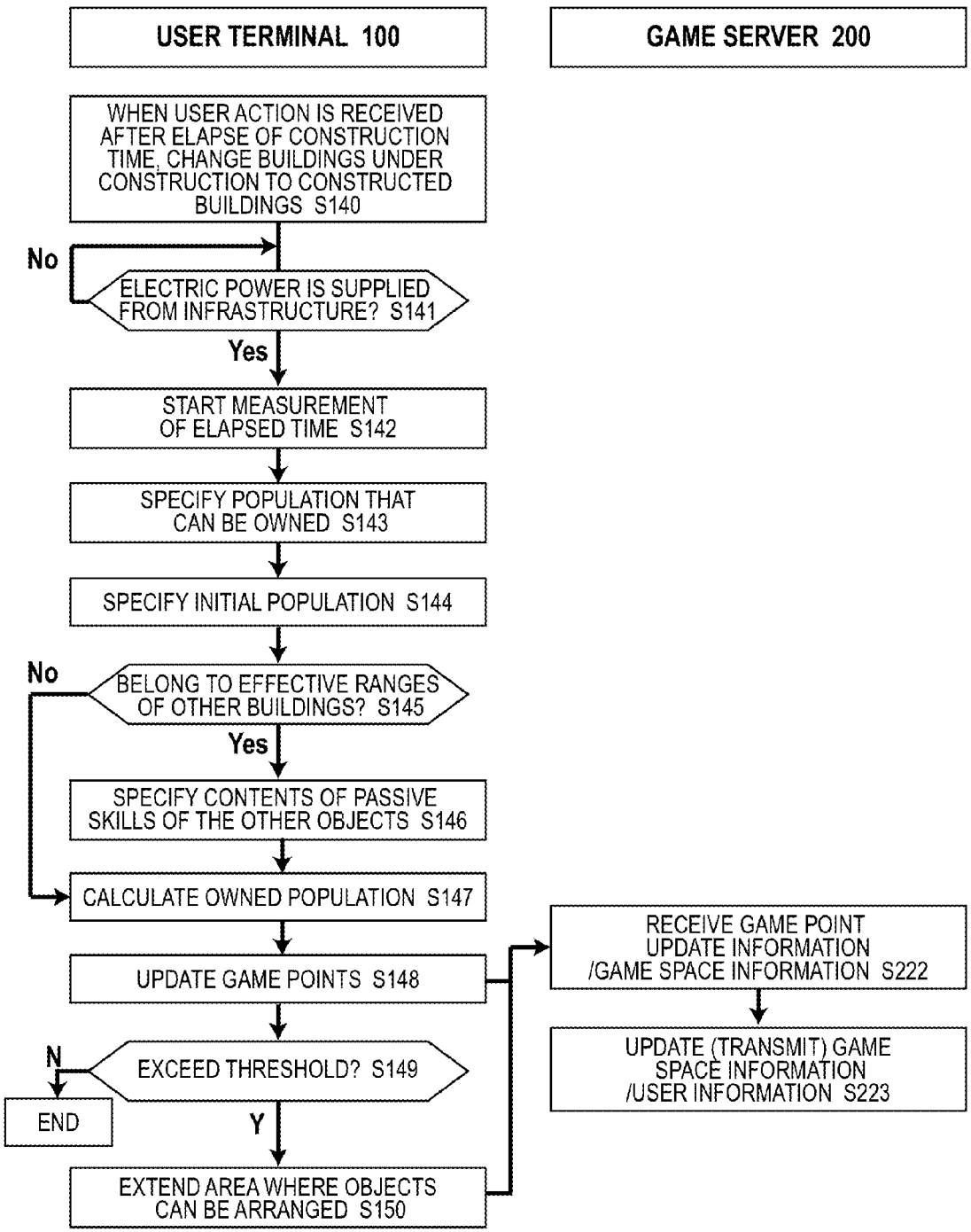
FIG. 26 is a flowchart illustrating processing in the game system in at least one embodiment.

Note that, as the effective ranges specified in the step for determining whether the condominiums OA1 and OB2 belong to effective ranges of the other building (S145), an effective range E7 of an active skill of a firehouse OA4 associated with the user A shown in FIG. 25 may be adopted. Processing in this case is the same as the processing shown in FIG. 16. However, the firehouse OA4 receives user action of only the user A. Consequently, the effective range E7 is specified. When fire occurs in the condominium O1 arranged within the effective range E7, the fire is extinguished by the active skill of the firehouse OA4. The game parameters are updated to operate the condominium OA1 again.

The active skill may cause fluctuation of only game points and a game parameter of an object associated with the user A, which generates the skill, among the objects arranged within the effective range. That is, when the condominium OA1, in which the fire occurs, is associated with the user B, the fire does not have to be extinguished by the active skill of the firehouse OA4. Note that the passive skill explained above may cause fluctuation of game points and a game parameter of an object associated with the user, which generates the skill.

A construction time and a cool time in the battle game space G2 of the objects may be different from a construction time and a cool time in the home game space G1. Further, when a battle time can be selected out of a plurality of battle times having different lengths, a construction time and a cool time may be changed according to the battle time. For example, when the battle time is short, the construction time and the cool time are set short. Consequently, it is possible to vary a sense of speed of game advance in the battle game space G2 according to the battle time. Therefore, the user can easily enjoy the battle game.

When the game points are updated as explained above (S148), whether the game points after the update exceed a threshold is determined (S149). When determining that the game points after the update exceeds the threshold, as indicated by a broken line in FIG. 21, the user terminal 100 increases the area of an area associated with the user among the first area PE1 to the fourth area PE4 (S150). Consequently, a degree of freedom of the game increases according to the advance of the game. The gameplay in town development elements and the like is improved. Note that, when the game points decrease, the areas of the first area PE1 to the fourth area PE4 may be reduced according to the decrease in the game points.

Note that it is also possible to set the first area PE1 to the fourth area PE4 large in the beginning and reduce the areas of the first area PE1 to the fourth area PE4 according to game points of the users. By limiting the degree of freedom of the game according to the advance of the game, it is requested to take into account a strategy for arranging objects from the beginning.

[2-3. Game Advance Processing 2 in the Battle Game Space]

An example of game advance processing further developed from the flow of the basic game advance processing in the battle game space G2 explained with reference to FIGS. 21 to 26 is further explained with reference to FIGS. 27 to 33. A flow of battle advance in a battle game space G3 (FIGS. 21 to 23) and advance processing involved in activation of the passive skills (FIG. 24 and FIG. 26) are not substantially different. On the other hand, advance processing involved in activation of the active skills is different from that depicted in FIG. 25. Specifically, in this processing example, as a game element for improving the gameplay of the battle game, an influential operation by activation of mob characters (MC in FIG. 2) (e.g., a battle by attack and defense of the mob characters) is introduced. By introducing a time element in the influential operation, an operation result is not determined by only the activation of the active skills due to the action of the user. The operation result is determined only through the subsequent influential operation for a predetermined time by computer control.

Figure 30:
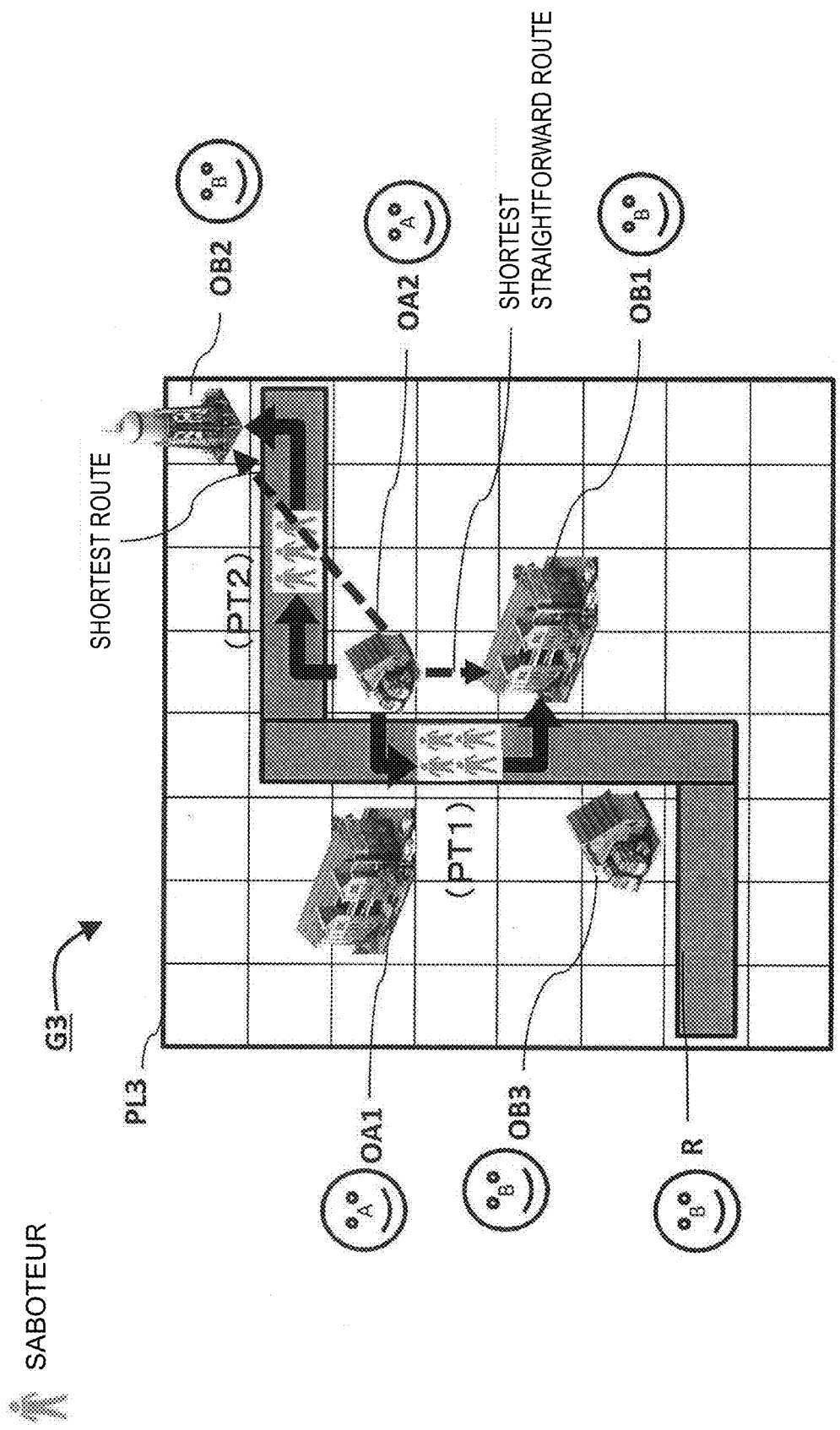
FIG. 30 is a diagram illustrating another example of the battle game space.
Figure 31:
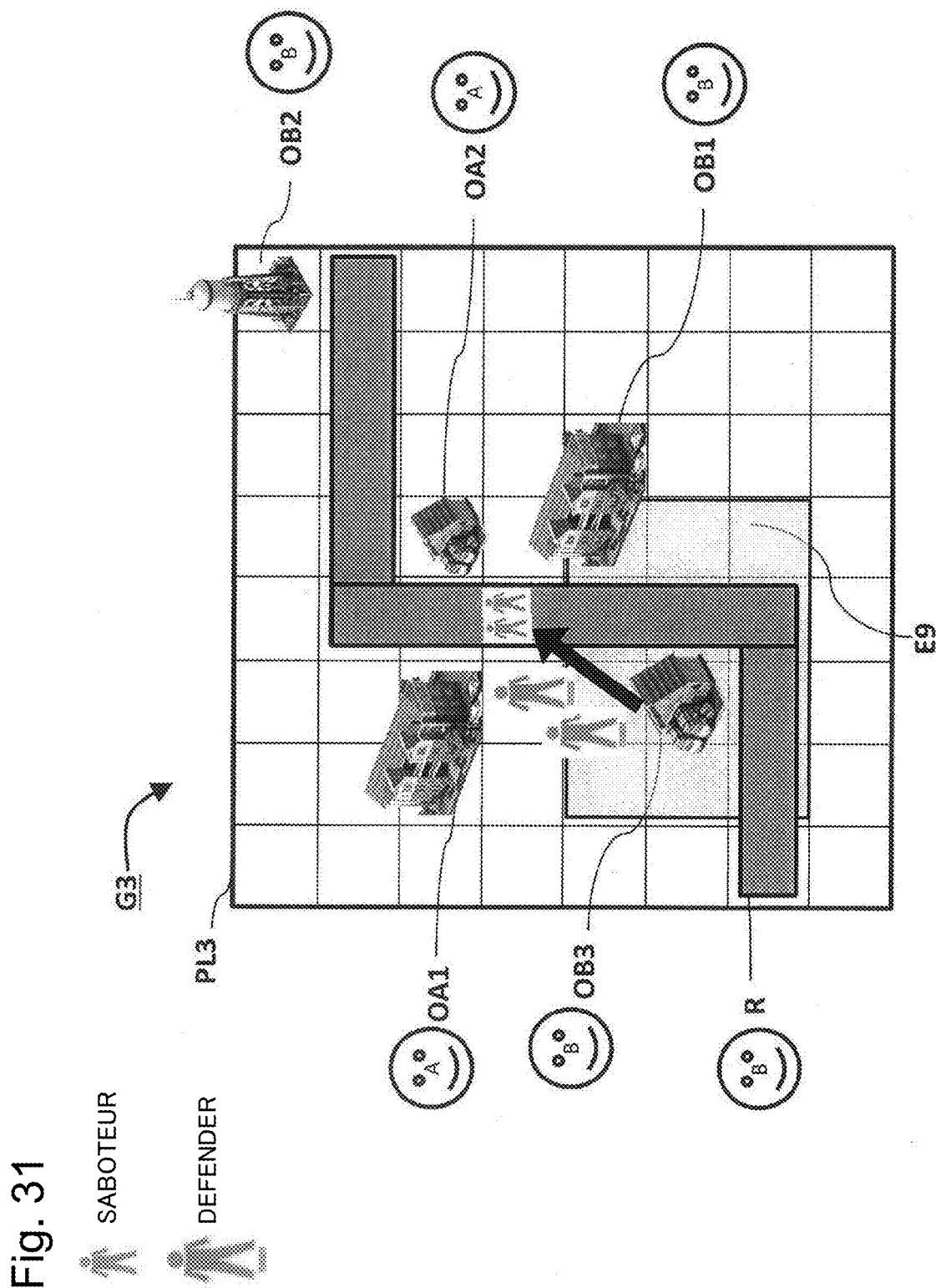
FIG. 31 is a diagram illustrating another example of the battle game space.

As an example, the mob characters are characters having a human shape movable on a space plane shown in FIG. 30 and FIG. 31. In particular, the mob characters are characters displayed on a screen to perform the influential operation between building objects in the battle game space G3 (FIG. 30 and FIG. 31). In the following explanation, a mob character for attack in the influential operation of attack and defense is referred to as a "saboteur" and a mob character for defense is referred to as a "defender". The saboteur and the defender are respectively master-managed according to a saboteur management table 360 shown in FIG. 27 and a defender management table 370 shown in FIG. 28. Both of the saboteur and the defender are associated with any game objects serving as dispatch sources. For example, a gang (FIG. 27) is associated with an office object as the saboteur. The gang is dispatched from the office object and operates to attack. On the other hand, a police officer (FIG. 28) is associated with a police station object as a defender. The police officer is dispatched from the police station object and operates to perform defense against the attack by the saboteur. The saboteur and the defender are not limited to this. The saboteur and the defender have various parameters such as dispatch speed indicating moving speed on a plane, offensive power, hit points, an influence interval indicating a time interval for performing attack and defense, and a disappearance time indicating duration of the mob character itself. It is possible to improve the gameplay of the battle game by causing hit points (HP shown in FIG. 20) of the objects to fluctuate on the basis of various parameters in the influential operation of attack and defense.

Figure 29:
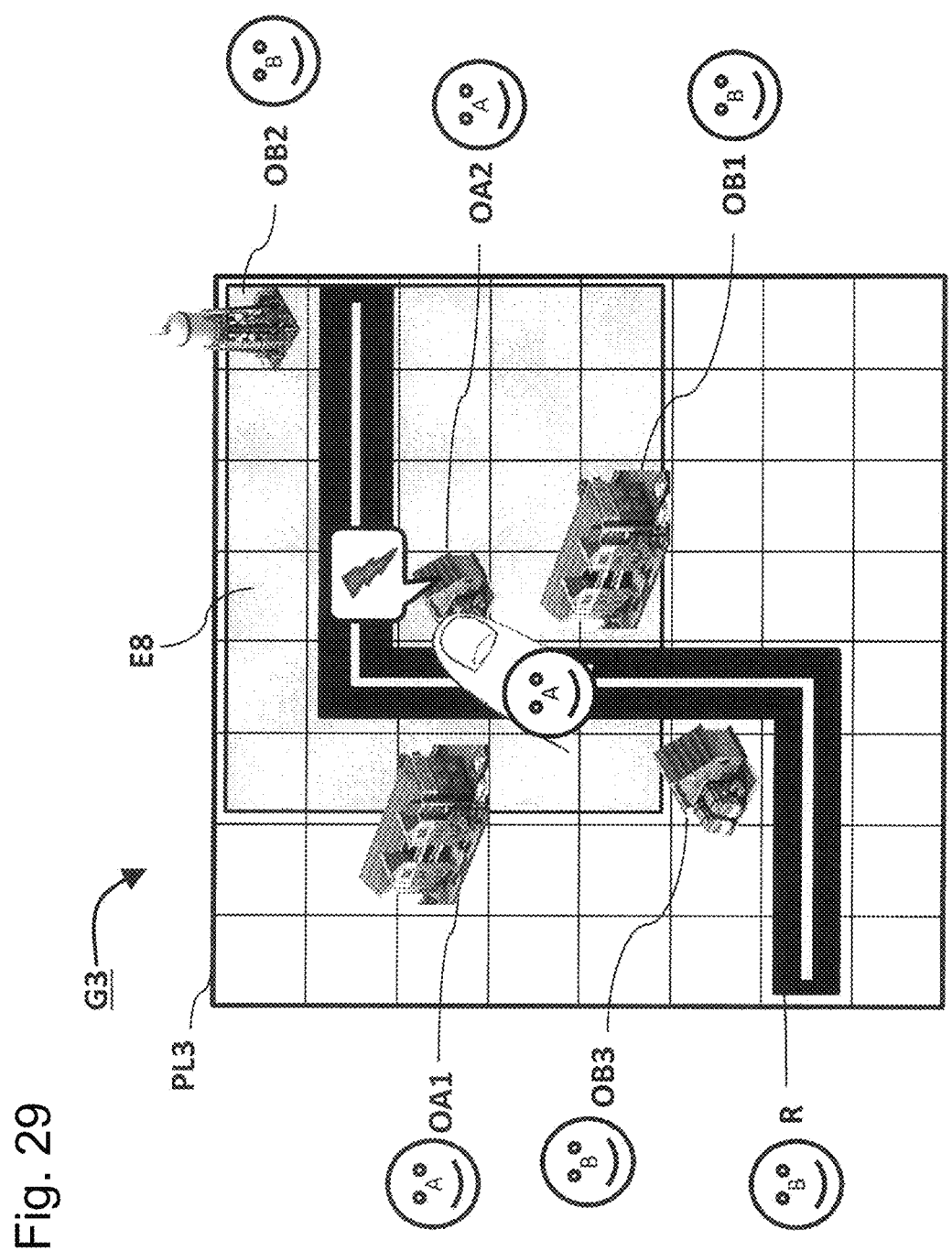
FIG. 29 is a diagram illustrating another example of the battle game space.
Figure 32:
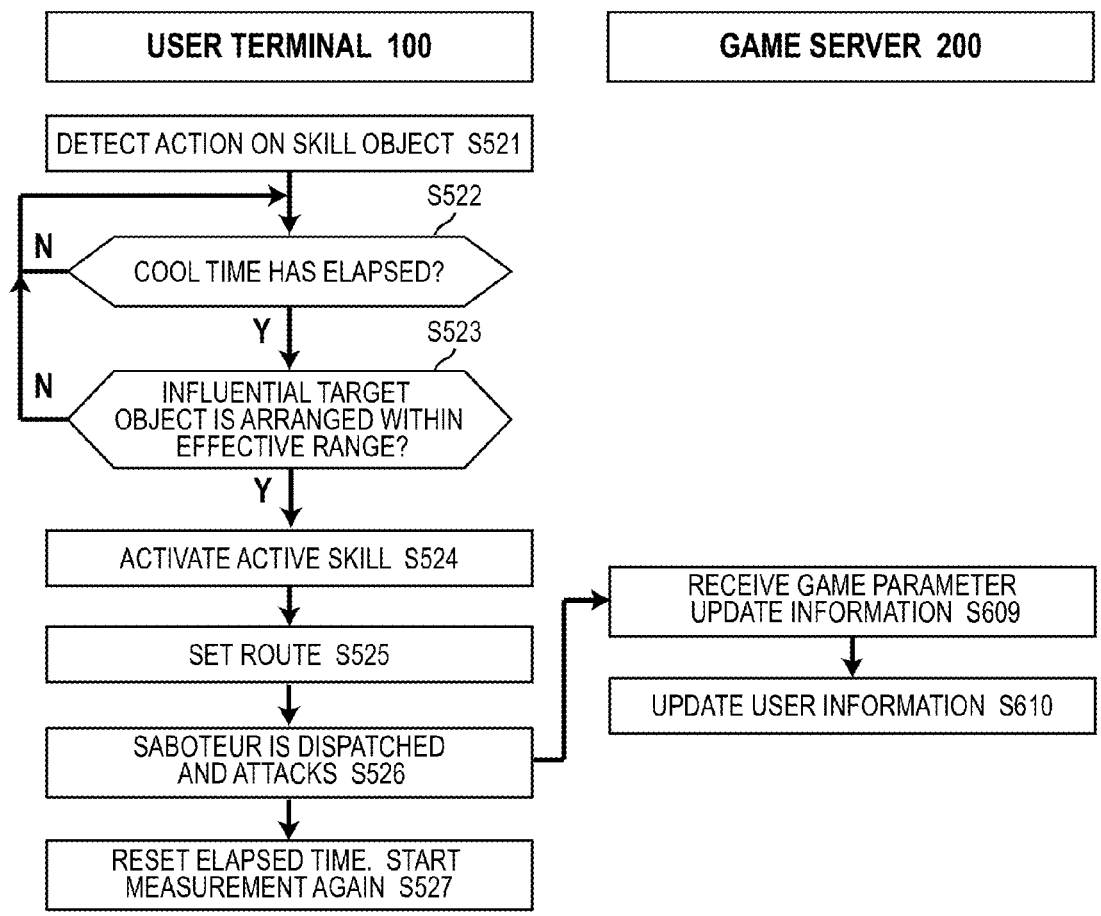
FIG. 32 is a flowchart illustrating processing in the game system in at least one embodiment.
Figure 33:
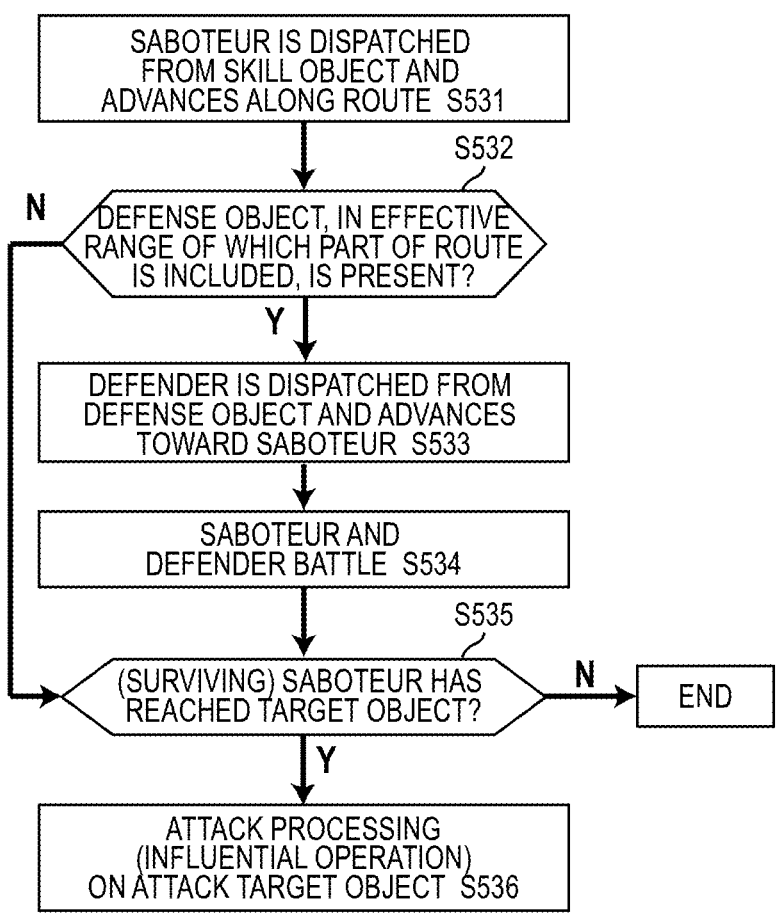
FIG. 33 is a flowchart illustrating processing in the game system in at least one embodiment.
Figure 34:
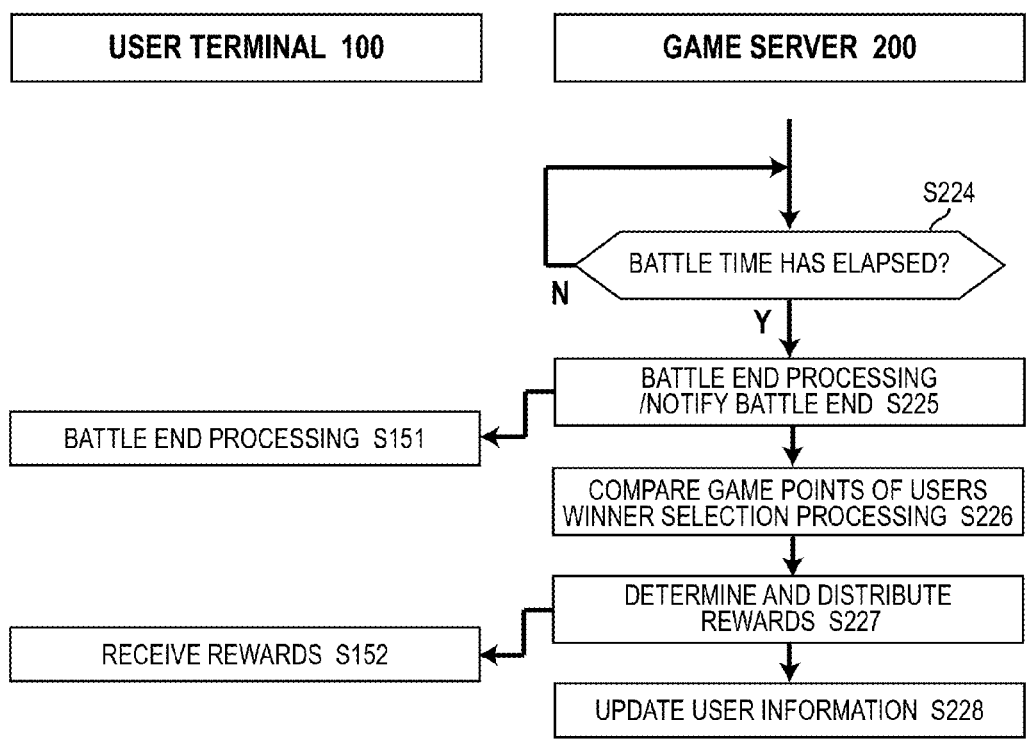
FIG. 34 is a flowchart illustrating processing in the game system in at least one embodiment.

The influential operation is explained in detail with reference to FIGS. 29 to 33. Examples of the battle game space G3 are shown in FIGS. 29 to 31. A processing flow for causing a computer to carry out processing of attack and defense is shown in FIG. 32 and FIG. 33. As shown in FIG. 29, objects described below are assumed as game objects arranged on a plane PL3 of the battle game space G3. That is, the condominium OA1 and the office OA2 associated with the user A and the condominium OB1, the electric power plant OB2, and the police station OB3 associated with the user B are arranged. The road R associated with the user B and shared by the user B and the user A are arranged in association with the objects OA1 and OA2 and OB1 to OB3 (that is, adjacent to the objects).

The action-receiving unit 111 of the user terminal 100 receives user action on a skill object through tap operation of the office OA2 by the user A. Processing in which the action-receiving unit 111 detects the user action on the skill object (S521) and processing in which the terminal-determining unit 114 determines elapse of a cool time (S522) are the same as S125 and S126 in FIG. 16. The terminal-determining unit 114 determines with reference to the battle user management table 340 and the object management table 310 that the condominium OB1 and the electric power plant OB2 of the user B, who is a battle user, are arranged within an effective range E8 (a 5×6 square) of the office OA2 (S523). As a result, the condominium OB1 and the electric power plant OB2 are specified as attack target objects by active skill activation.

The terminal-processing unit 112 executes activation processing for active skills on the condominium OB1 and the electric power plant OB2 (S524). At the same time, the terminal-determining unit 114 sets a route from the skill object to the attack target object (S525). Specifically, the terminal-determining unit 114 sets a straightforward route (a dotted line arrow) having the shortest distance from the office OA2 to the condominium OB1 and the electric power plant OB2 as shown in FIG. 30. In particular, when route setting is possible from the office OA2 to the condominium OB1 and the electric power plant OB2 via the road object R (e.g., when the straightforward route is along a road adjacent to a building object or when the straightforward route crosses the road), a route PT1 (equivalent to three squares) to the condominium OB1 and a route PT2 (equivalent to four squares) to the electric power plant OB2 may be set.

The terminal-processing unit 112 of the user terminal 100 executes, after the route setting, processing for dispatching the saboteur from the office OA2 to the condominium OB1 and the electric power plant OB2 along the routes PT1 and PT2 and attacking the condominium OB1 and the electric power plant OB2 (S526). The communication unit 140 of the user terminal 100 transmits, to the game server 200, information concerning game parameters and game points including hit points reduced by the attack on the condominium OB1 and the electric power plant OB2. Information update processing (S609 and S610) on the game server 200 side and elapsed time reset processing (S527) on the terminal 100 side performed thereafter are the same as S209, S210, and S129 in FIG. 16.

Note that, in the game advance example shown in FIG. 25, the object associated with the (own) user A is the target set as the active skill activation destination. However, in the game advance example shown in FIG. 29, an object associated with the (opponent) user B may be determined as the target set as the active skill activation destination. Consequently, it is possible to improve the gameplay of the battle game. Skill content associated with the office OA2 is specified in advance with reference to the skill management table 330 as being skill content for attacking buildings owned by other users present within an effective range. However, the target set as the active skill activation destination is not limited to this and may be an object associated with the (own) user A and a user group of the user A. The skill content may be, for example, a reduction in a construction time of a game object owned by the (own) user A or extinction of fire of the game object owned by the (own) user A as explained with reference to FIGS. 16 and 25.

In the game advance example, game objects include hit points (HP) in order to further improve the gameplay of the battle game (FIG. 20). Initial hit points of a game object may be determined on the basis of an object level corresponding to the initial hit points. That is, the initial hit points may be increased as the game object develops and the object level rises. The hit points are caused to fluctuate by attack by the saboteur and defense by the defender determined on the basis of the object level of the skill object according to computer control.

Processing in which the saboteur is dispatched from the skill object toward a skill activation destination (an attack target) object and attacks the skill activation destination object (S526) is further explained with reference to FIGS. 31 and 33. When route setting is performed by the terminal-processing unit 112, the saboteur is operated to advance along the routes PT1 and PT2 from the office OA2 to the condominium OB1 and the electric power plant OB2 (S531). A space image shown in FIG. 30 is displayed on the display unit 132. Subsequently, the terminal-determining unit 114 specifies other game objects of the user B; that is, an effective range E9 of the police station OB3 and determines whether at least a part of the route PT1 or PT2 belongs to the effective range E9 (S532). In the example shown in FIG. 31, a part of a route from the office OA2 to the condominium OB1 is included within the effective range E9 (a 3×4 square) of the police station OB3. In this case, the terminal-processing unit 112 executes processing for dispatching the defender from the police station OB3. That is, the police station OB3 functions as a defense object for performing defense against the advance of the dispatched saboteur, operates the defender to advance toward the saboteur, and displays the defender on the display unit 132 (S533). As the advance of the defender to the saboteur, the defender may be operated to directly advance in a saboteur position direction (an arrow shown in FIG. 31) on the plane PL2 or may be operated to advance along the route R like the advance of the saboteur shown in FIG. 30.

Note that the number of saboteurs advanced in S531 may be determined on the basis of an object level (OL; see FIG. 20) of an object associated with the electric power plant OB2. The number of mob characters stored in the object at a point in time of dispatch (that can be dispatched) is managed in association with the object level in the battle user management table 340 (FIG. 20). That is, as the object level OL rises, a larger number of mob characters may be able to be stored. In the example shown in FIG. 30, two paths PT1 and PT2 are set. The saboteurs are also divided into two groups according to the routes. However, the number of saboteurs of the groups may be distributed at random or may be weighted and distributed on the basis of, for example, the distances of the routes according to computer control. When a plurality of routes are set from a skill object to one attack target object (not shown in the figure), the saboteurs may be grouped in the same manner. The number of defenders dispatched in S533 may also be determined on the basis of an object level associated with the defense object. Grouping of the defenders performed when there are a plurality of routes is the same as the grouping of the saboteurs.

When the defender and the saboteur are associated because the saboteur was able to be captured as a result of the advance of the defender, the terminal-processing unit 112 automatically performs a battle of the saboteur and the defender according to computer control (S534). The capturing can be determined on the basis of dispatch speeds in the saboteur management table 360 and the defender management table 370. A battle result of the battle of the saboteur and the defender associated with each other can be determined using various parameters such as hit points, body strengths, influence intervals, and dispatch times in the saboteur management table 360 and the defender management table 370. As an example, the terminal-determining unit 114 may determine that the saboteur is eliminated (the saboteur loses) when the defender performs defense against the attack of the saboteur a predetermined number of times with predetermined offensive power at a predetermined influence (defense) interval for a dispatch period and, as a result, the hit points of the saboteur decrease to nearly zero and, on the other hand, the saboteur is allowed to survive when the hit points of the saboteur remain (are larger than zero) even after the dispatch period of the defender elapses.

As a result of the battle of the saboteur and the defender, the number of saboteurs is reduced from the initial number of dispatched saboteurs by the number of saboteurs eliminated by the defense of the dispatched defenders. When the remaining number of saboteurs is equal to or larger than one, the terminal-determining unit 114 determines that the saboteur has survived and determines that the saboteur has reached the attack target object (the condominium OB1 or the electric power plant OB2) (S535). When the survived saboteur operates to reach the attack target object and is displayed on the display unit 132, the terminal-processing unit 112 continues to carry out the attack operation on the attack target object (S536). Specifically, hit points (HP; FIG. 20) are associated with an object level of the attack target object. The hit points are caused to fluctuate on the basis of parameters (the number of reached saboteurs, predetermined offensive powers of the saboteurs, influence intervals, dispatch periods, and the like (FIG. 27)) associated with the object level of the skill object according to computer control. As an example, when the saboteur reaching the attack target object attacks the attack target object a predetermined number of times with predetermined offensive power at a predetermined influence interval for a dispatch period and, as a result, the hit points of the target attack object decrease to zero, the processing unit 112 may perform or may be caused to perform processing to disable the object and, at the same time, reduce an owned population to zero. In this way, the hit points can be a parameter that affects the owned population of the game object or can be a parameter serving as a base for calculating game points.

This processing example is processing for further improving the gameplay of the battle game by introducing the influential operation of the mob characters. For example, for the user A, the processing is an incentive to, in the active skill activation, dispatch the mob characters after closely examining arrangement positions of game objects arranged by the user B. As one possible scenario, first, the user A activates an active skill for a certain object once and activates the saboteur to thereby intentionally reduce the number of defenders of a defense object of the user B and weakens the defense object. Thereafter, the user A activates the active skill again from another object. Consequently, it is possible to effectively attack the attack target object without being substantially affected by the already weakened defense object. That is, it is possible to provide the user with various attack patterns and improve importance of strategic thinking of the user.

As a result of all the kinds of processing explained above, finally, when the elapsed times in the battle game spaces G2 and G3 exceed the predetermined battle time (Y in S224 in FIG. 34), as processing for ending the battle game, processing is performed not to arrange game objects in the battle game space G2 (S225). The end of the battle is notified to the user terminals 100. In the user terminals 100, as the processing for ending the battle game, processing is performed not to arrange game objects in the battle game space G2 (S151).

When the battle game is ended, processing for comparing game points of the users and selecting a winner is executed (S226). The selection of a winner may be performed by comparing the populations P serving as game points associated with the users. The populations P associated with the users are calculated by totaling owned populations associated with buildings associated with the users with reference to the battle user management table 340.

In the selection of a winner, ranks of the users may be determined on the basis of values of the populations P. Not only the populations P but also game parameters such as an in-game currency such as a coin, an in-game item, and hit points of the game objects may be taken into account. For example, victory and defeat may be determined on the basis of a total value of the population P and the coins C or may be determined according to a weighted average value obtained by weighting the population P or the coins C. Other elements such as an occupancy ratio of the game space G may be further taken into account.

When the winner and the ranks of the users are selected, rewards distributed to the users are determined. Information concerning the rewards to be distributed is transmitted to the user terminals 100 (S227). The user management table 300 is updated to give the rewards (S228). When receiving the rewards (S152), the user terminals 100 are shifted to the home game space G1 on which the rewards are reflected.

The embodiment explained above is only an illustration for facilitating understanding of the present disclosure and is not for limitedly interpreting the present disclosure. The present disclosure can be changed and improved without departing from the spirit of the present disclosure. It goes without saying that equivalents of the present disclosure are included in the present disclosure.

REFERENCE SIGNS LIST 1 game system
2 network
100 user terminal
110 control unit
120 storage unit
130 touch panel
140 communication unit
200 game server
210 communication device
220 processing device
230 memory unit
240 storage device
250 input device
260 output device
300 user management table
310 object management table
320, 330 skill management table
340 battle user management table
350 buy-out price calculation table
360 saboteur management table
370 defender management table
G game space
G1 home game space
G2 and G3 battle game space

What is claimed is:

1. A computer comprising a processor and a display, the processor executing a game program that causes the computer to perform operations comprising:
receiving information on a game space capable of being accessed by another computer configured with the game program through a network, at least a first object associated with the computer and a second object and a third object associated with the other computer being generated in the game space, and displaying the game space and the first to third objects on the display;
receiving information for synchronizing a time in the game space and in the computer;
moving, in the game space, a first character having a first number associated with the first object from the first object toward the second object and displaying the first character on the display;
moving, in the game space, a second character having a second number associated with the third object to advance toward the first character and displaying the second character on the display; and
reducing the first number on the basis of the second number according to the movement of the second character and moving the first character having the reduced first number to the second object and displaying the first character on the display.

2. The computer comprising the processor and the display, the processor executing the game program according to claim 1, wherein
the game program causes the computer to perform operations further comprising setting a route from the first object to the second object according to action on the first object performed by the the computer, and
the game program causes the computer to perform operations such that first character having the first number advances along the route in the moving the first character having the first number from the first object toward the second object and displaying the first character on the display.

3. The computer comprising the processor and the display, the processor executing the game program according to claim 2, wherein
the game program causes the computer to perform operations further comprising specifying an effective range in the game space associated with the third object and determining whether at least a part of the route is generated within the effective range of the third object, and
the game program causes the computer to perform operations such that moving the second character toward the first character and displaying the second character is performed when at least a part of the route is generated within the effective range.

4. The computer comprising the processor and the display, the processor executing the game program according to claim 2, wherein the game program causes the computer to perform operations further comprising:
generating, in the game space, a fourth object associated with the computer and the other computer, and
setting the route via the fourth object.

5. The computer comprising the processor and the display, the processor executing the game program according to claim 4, wherein
the game program is a game program for advance of a town development game,
the game program causes the computer to perform operations such that the receiving information on the game space, comprises generating each of the first to fourth objects on one or more lattices on a lattice-like space plane provided in the game space,
the first object, the second object, and the third object are building objects, and
the fourth object is a road object.

6. The computer comprising the processor and the display, the processor executing the game program according to claim 1, wherein the game program causes the computer to perform operations further comprising causing, according to a reach of the first character having the reduced first number to the second object, fluctuation of a second parameter associated with the second object.

7. The computer comprising the processor and the display, the processor executing the game program according to claim 1, wherein the first number is based on a first parameter associated with the first object.

8. A non-transitory computer readable medium configured with a game program that, when read and executed by a processor of a computer, causes the computer to perform operations comprising:
receiving information on a game space accessed by another computer configured with the game program through a network, at least a first object associated with the computer and a second object associated with the other computer being generated in the game space;
receiving information for synchronizing a time in the game space and in the computer;
setting a route from the first object to the second object according to action on the first object performed by the computer when at least a part of the second object is generated within an effective range of the first object; and
causing, according to the set route, fluctuation of a second parameter associated with the second object.

9. The non-transitory computer readable medium according to claim 8, wherein the computer further comprises a display, and the game program causes the computer to perform operations comprising:
moving, in the game space, a first character having a number defined by a first parameter associated with the first object along the route from the first object toward the second object and displaying the first character on the display; and
determining whether the first character reaches the second object, wherein
the causing the fluctuation of the second parameter is executed when the first character reaches the second object.

10. The non-transitory computer readable medium according to claim 9, wherein
the game program causes the computer to perform operations such that in the receiving the information on the game space, a third object associated with the other computer is further generated in the game space,
the game program causes the computer to perform operations further comprising: specifying an effective range in the game space associated with the third object; and determining whether at least a part of the route is arranged within the effective range of the third object, and
the game program causes the computer to perform operations such that causing the fluctuation of the second parameter causes the fluctuation of the second parameter according to a third parameter associated with the third object when at least the part of the route is generated within the effective range of the third object.

11. The non-transitory computer readable medium according to claim 10, wherein
the game program causes the computer to perform operations further comprising causing the computer to execute reducing a number of the first character that reaches the second object according to the third parameter associated with the third object, and
the game program causes the computer to perform operations such that causing the fluctuation of the second parameter depends on the number of the first character that reaches the second object.

12. The non-transitory computer readable medium according to claim 8, wherein the game program causes the computer to perform operations further comprising:
generating, in the game space, a fourth object associating the first object with the second object, and
setting the route is via the fourth object.

13. The non-transitory computer readable medium according to claim 12, wherein
the game program is a game program for advance of a town development game,
the game program causes the computer to perform operations such that in the receiving the information on the game space, each of the first to fourth objects is generated on one or more lattices on a lattice-like space plane provided in the game space,
the first object, the second object, and the third object are building objects, and
the fourth object is a road object.

14. The non-transitory computer readable medium according to claim 8, wherein the game program causes the computer to perform operations such that the second parameter is fluctuated according to a first parameter associated with the first object.

* * * * *